US009366571B2

(12) United States Patent
Pervez et al.

(10) Patent No.: US 9,366,571 B2
(45) Date of Patent: Jun. 14, 2016

(54) PHOTONIC CRYSTAL SENSOR APPARATUS AND TECHNIQUES

(71) Applicant: The Trustees of Columbia University in the City of New York, New York, NY (US)

(72) Inventors: Nadia Pervez, Houston, TX (US); Ioannis Kymissis, New York, NY (US); Zhang Jia, Santa Clara, CA (US); Marshall Cox, Brooklyn, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 51 days.

(21) Appl. No.: 14/507,175

(22) Filed: Oct. 6, 2014

(65) Prior Publication Data
US 2015/0124252 A1    May 7, 2015

Related U.S. Application Data

(63) Continuation of application No. 13/331,392, filed on Dec. 20, 2011, now Pat. No. 8,854,624, which is a continuation-in-part of application No. PCT/US2010/052180, filed on Oct. 11, 2010.

(Continued)

(51) Int. Cl.
*G01J 3/28* (2006.01)
*G01J 3/02* (2006.01)
(Continued)

(52) U.S. Cl.
CPC ............... *G01J 3/0205* (2013.01); *G01J 3/02* (2013.01); *G01J 3/0259* (2013.01); *G01J 3/12* (2013.01); *G02B 1/005* (2013.01)

(58) Field of Classification Search
CPC .................................. G01J 3/02; G02B 1/005
See application file for complete search history.

(56) References Cited

U.S. PATENT DOCUMENTS

| 5,121,030 A | 6/1992 | Schott |
| 5,214,736 A | 5/1993 | Uemiya et al. |

(Continued)

FOREIGN PATENT DOCUMENTS

| DE | 10310645 B3 | 11/2004 |
| WO | WO-2004/063432 A1 | 7/2004 |

(Continued)

OTHER PUBLICATIONS

M. Rattier, "Omnidirectional and compact guided light extraction from Archimedean photonic lattices", AIP Jun. 13, 2003.*

(Continued)

*Primary Examiner* — Gregory J Toatley
*Assistant Examiner* — Maurice Smith
(74) *Attorney, Agent, or Firm* — Schwegman Lundberg & Woessner, P.A.

(57) ABSTRACT

Apparatus and methods can include an optical waveguide coupled to a photonic crystal comprising a dielectric material, the photonic crystal located on an exterior surface of the optical waveguide and comprising a first surface including a first array of periodic features on or within the dielectric material, the array extending in at least two dimensions and including an effective dielectric permittivity different from the surrounding dielectric material. In an example, the periodic features include a specified lattice constant, the periodic features configured to extract a portion of propagating optical energy from the waveguide through the photonic crystal, the portion determined at least in part by the specified lattice constant.

22 Claims, 15 Drawing Sheets
(6 of 15 Drawing Sheet(s) Filed in Color)

Related U.S. Application Data

(60) Provisional application No. 61/425,681, filed on Dec. 21, 2010, provisional application No. 61/349,570, filed on May 28, 2010, provisional application No. 61/278,773, filed on Oct. 12, 2009.

(51) Int. Cl.
  *G01J 3/12* (2006.01)
  *G02B 1/00* (2006.01)

(56) References Cited

U.S. PATENT DOCUMENTS

| | | |
|---|---|---|
| 6,075,915 A | 6/2000 | Koops et al. |
| 6,123,845 A | 9/2000 | Asher et al. |
| 6,226,083 B1 | 5/2001 | Schwerzel et al. |
| 6,507,709 B2 | 1/2003 | Hirai et al. |
| 6,589,452 B2 | 7/2003 | Asher et al. |
| 6,640,034 B1 | 10/2003 | Charlton et al. |
| 6,667,808 B2 | 12/2003 | Clermont et al. |
| 6,738,551 B2 | 5/2004 | Noda et al. |
| 6,879,451 B1 | 4/2005 | Hewlett et al. |
| 6,977,378 B2 | 12/2005 | Tanaka |
| 6,999,669 B2 | 2/2006 | Summers et al. |
| 7,065,280 B2 | 6/2006 | Ogawa et al. |
| 7,075,705 B1 | 7/2006 | Koops et al. |
| 7,077,984 B1 | 7/2006 | Natarajan et al. |
| 7,079,240 B2 | 7/2006 | Scherer et al. |
| 7,092,101 B2 | 8/2006 | Brady et al. |
| 7,145,614 B2 | 12/2006 | Lee et al. |
| 7,148,475 B2 | 12/2006 | Cozic et al. |
| 7,170,600 B2 | 1/2007 | Nishii et al. |
| 7,250,591 B2 | 7/2007 | Mouli |
| 7,274,458 B2 | 9/2007 | Perez et al. |
| 7,382,958 B1 | 6/2008 | Shi |
| 7,390,461 B2 | 6/2008 | Grier et al. |
| 7,411,670 B2 | 8/2008 | Zribi et al. |
| 7,433,036 B2 | 10/2008 | Thomson et al. |
| 7,440,658 B2 | 10/2008 | Furuya et al. |
| 7,483,466 B2 | 1/2009 | Uchida et al. |
| 7,599,061 B1 | 10/2009 | Ting et al. |
| 7,683,311 B2 | 3/2010 | Mouli |
| 7,768,640 B2 | 8/2010 | Cunningham et al. |
| 7,780,831 B2 | 8/2010 | Gabriel |
| 7,796,849 B2 | 9/2010 | Adibi et al. |
| 7,826,131 B2 | 11/2010 | Arsenault et al. |
| 8,854,624 B2 | 10/2014 | Pervez et al. |
| 2001/0012149 A1 | 8/2001 | Lin et al. |
| 2006/0017928 A1 | 1/2006 | Crowther |
| 2007/0196571 A1 | 8/2007 | Ozin et al. |
| 2008/0224103 A1 | 9/2008 | Arsenault et al. |
| 2008/0224121 A1 | 9/2008 | Bose et al. |
| 2008/0246961 A1 | 10/2008 | Zhang et al. |
| 2008/0265137 A1 | 10/2008 | Cunningham et al. |
| 2009/0008735 A1 | 1/2009 | Ogino et al. |
| 2009/0040613 A1 | 2/2009 | Feng |
| 2009/0079976 A1 | 3/2009 | Cunningham et al. |
| 2009/0195778 A1 | 8/2009 | Yankov |
| 2009/0273779 A1 | 11/2009 | Baumberg et al. |
| 2009/0323060 A1 | 12/2009 | Knipp |
| 2010/0046060 A1 | 2/2010 | Lee et al. |
| 2010/0046077 A1 | 2/2010 | Lee et al. |
| 2010/0053755 A1 | 3/2010 | Lee et al. |
| 2010/0065732 A1 | 3/2010 | Ye et al. |
| 2010/0085566 A1 | 4/2010 | Cunningham |
| 2010/0150511 A1 | 6/2010 | Arsenault et al. |
| 2012/0020672 A1 | 1/2012 | Aguren |
| 2012/0206726 A1 | 8/2012 | Pervez et al. |

FOREIGN PATENT DOCUMENTS

| | | |
|---|---|---|
| WO | WO-2006/081565 A1 | 8/2006 |
| WO | WO-2006/096455 A1 | 9/2006 |
| WO | WO-2011/046875 A1 | 4/2011 |
| WO | WO-2012/088117 A1 | 6/2012 |
| WO | WO-2013/158842 A1 | 10/2013 |

OTHER PUBLICATIONS

"680 FTIR: Industry leading FTIR spectroscopy performance", [online]. [archived on Apr. 15, 2011]. Retrieved from the Internet: <URL: https://web.archive.org/web/20110415031135/http://www.chem.agilent.com/en-US/Products/instruments/molecularspectroscopy/ftir/systems/680-ftir/pages/default.aspx>, (Apr. 15, 2011), 2 pgs.

"Alpha FT-IR Spectrometer", [online]. © 2009 Bruker Optics. [archived on Dec. 2, 2009]. Retrieved from the Internet: <URL: https://web.archive.org/web/20091202124911/http://www.brukeroptics.com/alpha.html?>, (Dec. 2, 2009), 2 pgs.

"U.S. Appl. No. 13/331,382, Examiner Interview Summary mailed Mar. 26, 2014", 3 pgs.

"U.S. Appl. No. 13/331,392, Non Final Office Action mailed Nov. 7, 2013", 18 pgs.

"U.S. Appl. No. 13/331,392, Notice of Allowance mailed May 30, 2014", 9 pgs.

"U.S. Appl. No. 13/331,392, Response filed Apr. 4, 2014 to Non Final Office Action mailed Nov. 7, 2013", 17 pgs.

"Company Profile: nanoLambda", Nanotech Europe 2009. © 2009 Spinverse. [online]. [retrieved on Apr. 29, 2010]. Retrieved from the Internet: <http://www.nanotech.net/content/conference/themes/investment/nanotech-ventures/company-profile-spectrometer-a-chip-based-pla>, (2009), 2 pgs.

"International Application Serial No. PCT/US2010/052180, Preliminary Report on Patentability mailed Apr. 26, 2012", 8 pgs.

"International Application Serial No. PCT/US2010/052180, Search Report mailed Dec. 1, 2010", 16 pgs.

"International Application Serial No. PCT/US2010/052180, Written Opinion mailed Dec. 1, 2010", 16 pgs.

"International Application Serial No. PCT/US2011/066167, International Preliminary Report on Patentability mailed Jul. 4, 2013", 9 pgs.

"International Application Serial No. PCT/US2011/066167, International Search Report mailed Apr. 24, 2012", 2 pgs.

"International Application Serial No. PCT/US2011/066167, Written Opinion mailed Apr. 24, 2012", 7 pgs.

"International Application Serial No. PCT/US2013/037114, International Search Report mailed Aug. 8, 2013", 3 pgs.

"International Application Serial No. PCT/US2013/037114, Written Opinion mailed Aug. 8, 2013", 6 pgs.

"Jaz modular optical sensing", [online]. [retrieved on Mar. 19, 2014]. Retrieved from the Internet: <URL: http://www.oceanoptics.com/products/jaz.asp>, (Mar. 19, 2014), 3 pgs.

"Nano Lambda: Spectrum Analysis sensor: Part I", UStream. [online]. [retrieved on Apr. 29, 2010]. Retrieved from the Internet: <URL: http://www.ustream.tv/recorded/3840286>. Posted Jan. 8, 2010 at 6:39 pm, 61 second video, (2010), 2 pgs.

"Nano Lambda: Spectrum Analysis sensor: Part I", UStream. [online]. [retrieved on Apr. 29, 2010] Retrieved from the Internet: <URL: http://www.ustream.tv/recorded/3840266> Posted Jan. 8, 2010 at 6:38 pm, 40 second video, (2010), 2 pgs.

"Nano-Optic Devices: Applications of Digital Planar Holography in Photonic Lightwave Circuits", © 2007, Nano-Optic Devices, LLC. [online]. [retrieved on Apr. 29, 2010]. Retrieved from the Internet: <URL: http://www.nanoopticdevices.com/applications.htm>, (2007), 3 pgs.

"P-ink display, Opalux, Canada", [online]. © 2014 Opalux Inc. [retrieved on Mar. 19, 2014]. Retrieved from the Internet: <URL: http://opalux.com/?page=pink>, (Mar. 19, 2014), 2 pgs.

"Probe4Light: Spectral Characterization of Light Sources", [online]. [retrieved on Mar. 19, 2014]. Retrieved from the Internet: <URL: http://www.majantys.com/var/fr/storage/original/application/a3eff01d79d0ae09083fffcb74535678.pdf>, (Mar. 19, 2014). 7 pgs.

"Spectrum 100 FTIR Spectrometer", [online]. [archived on Dec. 26, 2010]. Retrieved from the Internet: <URL: https://web.archive.org/web/20101226172459/http://las.perkinelmer.com/Catalog/ProductInfoPage.htm?ProductID=L1250002A>, (Dec. 26, 2010), 1 pg.

(56) References Cited

OTHER PUBLICATIONS

Boroditsky, M., et al., "Light extraction from optically pumped light-emitting diode by thin-slab photonic crystals", *Appl. Phys. Lett.*, 75(8), (Aug. 2009), 1036-1038.

Chu, Baojin, et al., "A dielectric polymer with high electric energy density and fast discharge speed", *Science*, 313(5785), (Jul. 21, 2006), 334-6.

Fonjallaz, P. Y., et al., "Bragg gratings with efficient and wavelength-selective fiber out-coupling", *Journal of Lightwave Technology*, 15(2), (1997), 371-376.

Galli, M., et al., "Optical properties and photonic bands of GaAs photonic crystal waveguides with tilted square lattice", *The European Physical Journal B—Condensed Matter and Complex Systems*, 27(1), (2002), 79-87.

Gan, X., et al., "A high-resolution spectrometer based on a compact planar two dimensional photonic crystal cavity array", *Appl. Phys. Lett.*, 100, 231104, (2012), 4 pgs.

Houdre, Romuald, "Near Infrared Optical Characterization Techniques for Photonic Crystals", *Photonic Crystals: Physics and Technology*, (2009), 173-192.

Juarez, Beatriz H., et al., "Selective Formation of Inverted Opals by Electron Beam Lithography", *Advanced Materials*, 16(19), (2004), 1732-1736.

Kim, Shin-Hyun, et al., "Integration of Colloidal Photonic Crystals toward Miniaturized Spectrometers", *Advanced Materials*, 22(9), (Mar. 5, 2010), 946-950.

Kim, Shin-Hyun, et al., "Robust chirped photonic crystals created by controlled colloidal diffusion", *Angew Chem Int Ed Engl.*, 50(49), (2011), 11649-53.

Livanos, A C, et al., "Chirped-grating demultiplexers in dielectric waveguides", *Applied Physics Letters*, vol. 30, No. 10, (1977), 519-521.

Momeni, B. et al., "Compact On-Chip Photonic Crystal Spectrometers for Integrated Sensing Applications", *Conference Paper Frontiers in Optics (FiO)*, Rochester, New York, (Oct. 10, 2006), 1 pg.

Momeni, B., et al., "An on-chip silicon grating spectrometer using a photonic crystal reflector", *Journal of Optics*, 12(3), (2010), 035501.

Momeni, B., et al., "Design and applications of strongly dispersive photonic crystal structures", *Proc. SPIE 6901, Photonic Crystal Materials and Devices VII, Conference* vol. 6901, (2008), 690107.1-690107.

Momeni, Babak, et al., "Compact demultiplexers and spectrometers for integrated photonics", *Optoelectronics & Optical Communications, SPIE Newsroom*, (2006).

Momeni, Babak, et al., "Integrated photonic crystal spectrometers for sensing applications", *Optics Communications*, 282(15), (2009), 3168-3171.

Momeni, Babak, et al., "Planar photonic crystal microspectrometers in silicon-nitride for the visible range", *Optics Express*. 17(19), (2009), 17060-17069.

Moslehi, B., "Exploiting Unusual Characteristics of Photonic Crystals for Novel Optical Device", Form B—Proposal Summary—Proposal No. 02-H5.03-9178 / NASA SBIR (Small Business Innovative Research), [online]. [archived Jun. 11, 2010]. Retrieved from the Internet: <URL: http://web.archive.org/web/20100611034225/http://sbir.gsfc.nasa.gov/SBIR/abstracts/02/sbir/phase1/SBIR-02-1-H5.03-9178.html>, (2010), 2 pgs.

Park, Gyu, et al., "A wavelength-selective photonic-crystal waveguide coupled to a nanowire light source", *Nature Photonics*, 2, (2008), 622-626.

Pervez, Nadia, et al., "Photonic Crystal Spectrometer", Columbia Laboratory for Unconventional Electronics (CLUE); *APS Meeting*, vol. 55, No. 2, (Mar. 19, 2010), 15 pgs.

Pervez, Nadia K., et al., "Photonic crystal spectrometer", *Optics Express*. 18(8), (Apr. 12, 2010), 8277-8285.

Saxena, Kanchan, et al., "Implementation of anti-reflection coating to enhance light out-coupling in organic light-emitting devices", *Journal of Luminescence*, 129(3), (2008), 525-530.

Schilling, J., et al., "A model system for two-dimensional and three-dimensional photonic crystals macroporous silicon", *Journal of Optics A: Pure and Applied Optics*, 3(6), (2001), S121.

Schmid, Lawrence S, "Spectroscopy: Enduring During Uncertain Times", [online]. Retrieved from the Internet: <URL: http://www.spectroscopyonline.com/spectroscopy/article/articleDetail.jsp?id=588123&pageID=1&sk=&date=>, (Mar. 1, 2009), 12 pgs.

Shim, Tae Soup, et al., "Dynamic Modulation of Photonic Bandgaps in Crystalline Colloidal Arrays Under Electric Field", *Advanced Materials*, 22(40), (Oct. 25, 2010), 4494-4498.

Walsh, David, "Current Market Trends in Spectroscopy", *Spectroscopy Magazine, SPIE Optics East*, Seaport World Trade Center, Boston, MA, United States; Sep. 9-12, 2007, 19 pgs.

European Application Serial No. 10823905.4, Extended European Search Report mailed Feb. 25, 2016, 8 pgs.

Blouke, M M, et al., "Ultraviolet downconverting phosphor for use with silicon CCD imagers", Applied Optics, Optical Society of America, Washington, DC; US, vol. 19, No. 19, (Oct. 1, 1980), 3318-3321.

\* cited by examiner

PHOTONIC CRYSTAL SENSOR APPARATUS AND TECHNIQUES

CLAIM OF PRIORITY

This application is a continuation of U.S. patent application Ser. No. 13/331,392, filed on Dec. 20, 2011, which claims the benefit of priority of U.S. Provisional Patent Application Ser. No. 61/425,681, entitled "Infrared Photonic Crystal Spectrometer," filed Dec. 21, 2010 and which is a continuation-in-part of International Application No. PCT/US2010/052180, filed Oct. 11, 2010 and published as WO 2011/046875 A1, titled "Photonic Crystal Spectrometer," on Apr. 21, 2011, which claims the benefit of priority to U.S. Provisional Patent Application Ser. No. 61/278,773, entitled "Photonic Crystal Spectrometer," filed on Oct. 12, 2009 and U.S. Provisional Patent Application Ser. No. 61/349,570, entitled "Photonic Crystal Spectrometer," filed on May 28, 2010, the benefit of priority to each of which is hereby respectively presently claimed, and each of which is hereby incorporated by reference herein in its respective entirety.

BACKGROUND

Optical spectrometers are devices that, when exposed to optical radiation, are able to 'read' the wavelengths of incident light and output a data set that can be used to tell a hardware device or a user the specific spectral content of that incident radiation. They can be used in a variety of applications, from academic to industrial settings, in research or in design. Generally, spectrometers rely on spectral separation of light via diffraction gratings, which is followed by detection via a coupled optical detector. Use of such gratings can involve extremely tight manufacturing tolerances, as well as extensive after-production qualification and calibration. Generally, commercial spectrometers using such gratings can cost thousands of dollars, and high-end spectrometers can cost tens of thousands of dollars.

Light incident on a diffraction grating is reflected off of the grating, such as at an angle dependent on the wavelength of the incident light. Differing wavelengths of light then spatially separate downstream of this grating, and are generally measured by a linear detector array. This spatially-resolved information is then converted to wavelength-resolved information using the geometry of the diffraction grating and the distance from the grating to the detector. To obtain high spectral resolution, the distance from the grating to the detector is generally quite long, resulting in physically large spectrometers.

One recent improvement to this diffractive grating approach is the use of the enhanced diffraction via the superprism effect in photonic crystals. However, this approach still scales in the same manner as a diffractive grating spectrometer. Smaller diffractive grating spectrometers generally sacrifice spectral bandwidth for spectral resolution.

For infrared (IR) measurements, Fourier transform infrared (FTIR) spectrometers are more commonly employed than diffractive grating spectrometers. In FTIR, measurements are spectrally resolved through the movement of mirror positions in an interferometer. The resolution is dependent on how precisely the mirror movements can be controlled. FTIR has the advantage of not requiring a detector array, but at the cost of requiring moving parts.

OVERVIEW

This document describes a new and disruptive technology for spectroscopic analysis. In an example, the technology can incorporate an array of photonic crystals. Photonic crystals can provide periodic optical structures that can interact with visible light or other electromagnetic waves in a manner characterized by the structural specifics of the array, such as a lattice constant of a particular patterned region or element included in the array. When electromagnetic radiation is coupled into a substrate, without substrate modification, it can be waveguided to the end of the substrate uninhibited—much like it would in a fiber-optic cable. However, when photonic crystals are provided, such as patterned on the surface of this substrate, or when a photonic crystal is coupled to the substrate, specific wavelength components of the light can be directed out of the surface of the substrate (e.g., extracted from the substrate). The extracted wavelengths can include a wavelength distribution and spatial location defined by the photonic crystal structure.

An array of such photonic crystals can be used to provide a substrate that emits light in spatially defined patterns that define or deterministically relate to an incoming spectrum of light propagating through the waveguiding substrate. The outcoupled light extracted by the photonic crystal can be coupled to an inexpensive camera or other optical detector (e.g., a cellphone-camera), which can then record an image of the detected light pattern (including the intensity or wavelength of the detected light at various locations on the surface of the photonic crystal). The information provided by the optical detector can be used to determine the incident radiation spectrum, or the presence and intensity of one or more specific ranges of wavelengths (e.g., for detection of a particular atomic or molecular emission line, among others). Analysis of the images can then be performed via a computer or other electronics, such as including a processor configured to receive the information from the optical detector.

The present inventors have recognized that the use of a photonic crystal to spatially resolve incoming optical energy, such as according to wavelength, can drastically reduce the complexity, production cost, or size of optical spectrometers, and can be applicable to any or all wavelengths detectable by a coupled optical detector (including UV or infrared, such as directly detected by the optical detector, or converted into a range of wavelengths detectable by the optical detector).

For example, a substrate can be patterned with a photonic crystal array using one or more nano-imprint technologies such as in batch sizes that can trivialize the cost of each discrete photonic crystal substrate. The optical detector can include a mass-produced cellphone-like camera, since such cameras can have sufficient resolution for this application, and thus the optical detector can also be extremely inexpensive. The greatly miniaturized spectrometer and decreased price can open new markets. After optimization and scaling, a commercial production would likely cost significantly less than the existing market price of spectrometer or photometric devices that rely on precision grating structures.

The photonic crystal spectrometer can be both small and inexpensive. This can allow entrance into many niche markets that otherwise might not exist. One particular such application can include color feedback and auto-tuning for printers. An on-board spectrometer with standard LED illumination can detect and compensate for color printing issues, and can be used for determining paper-ink uniformity (e.g., glossy vs. matte). The present photonic crystal spectrometer can also be used in color matching applications, such as for paint matching, or in an ink-dropper computer peripheral such as to select real-world colors with accuracy. There are many possible niche markets. Beyond niche markets, the present photonic crystal spectrometer would be competitive against other technology, as it can deliver comparable performance at a fraction of the size and cost.

The present photonic crystal spectrometer technology can allow spectrometer devices to be miniaturized (e.g., to a volume of about one cubic centimeter or even less), using components and processes that, after tooling, qualification, and prototyping, would provide a final product that can be relatively inexpensive to produce. Notably, the present photonic crystal spectrometer technology can perform as well as existing technology, with the added capability of being highly customizable for specific applications.

If only a certain number of wavelengths in the spectrum are important for a particular application, such as in a chemical sensing or plasma sensing application, photonic crystals responsive to only those specific wavelengths can be provided, such as patterned on the substrate. For example, a plasma sensing application can include atmospheric sensing of a plasma. In an example, plasma sensing can include in-process sensing, such as in-chamber monitoring of one or more of a color distribution or an intensity distribution, such as to determine a species included in the plasma, or to detect a phase or state of process activity, such as an etching process completion).

Such custom spectrometers can be produced that respond strongly to one or more specific chemicals, biological agents, colors, or even to mimic the photopic response of the human eye (e.g., mapping the response of the custom spectrometer to a desired color space, such as a two-dimensional or 10-dimensional space, or another space). This combination of cost reduction, miniaturization, and customizability is not believed possible using existing diffraction-grating-based spectrometer technology.

In examples, apparatus and methods can include an optical waveguide coupled to a photonic crystal comprising a dielectric material. The photonic crystal can be located on an exterior surface of the optical waveguide. The photonic crystal can comprise a first surface including a first array of periodic features on or within the dielectric material. The array can extend in at least two dimensions and can include an effective dielectric permittivity different from the surrounding dielectric material. In an example, the periodic features include a specified lattice constant, the periodic features configured to extract a portion of propagating optical energy from the waveguide through the photonic crystal, the portion determined at least in part by the specified lattice constant. These examples can be combined in any permutation or combination.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
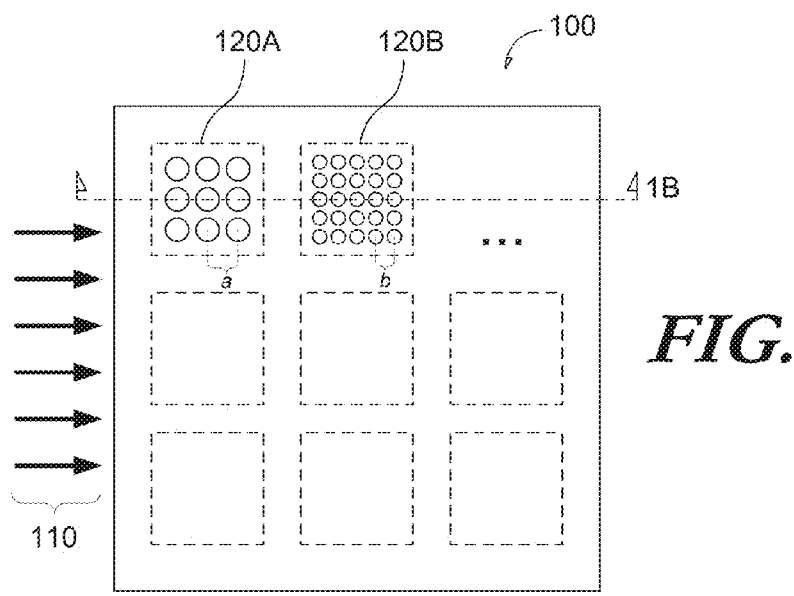
FIGS. 1A-B illustrate generally an example of an apparatus that can include a waveguide, and a photonic crystal including an array of periodic features.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
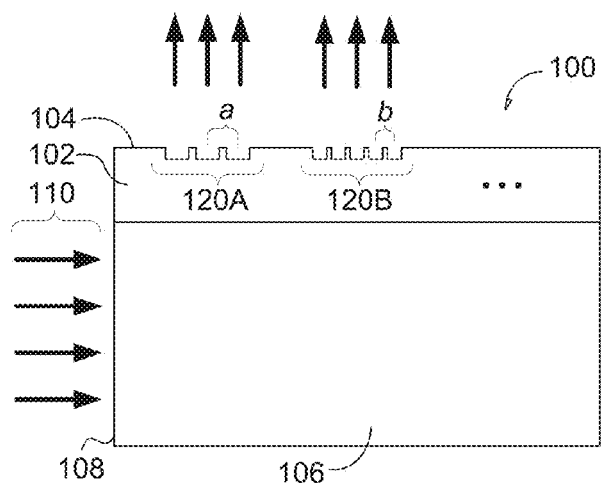

FIGS. 1A-B illustrate generally an example of an apparatus 100 that can include a waveguide 106, and a photonic crystal 102 that can include an array of periodic features, such as in a first region 120A, or a second region 120B. In an example, one or more of the first or second arrays of periodic features in the regions 120A-B can be formed, imprinted, or otherwise patterned on the waveguide 106 itself, or the photonic crystal 102 can be separately fabricated and mechanically coupled to the waveguide 106. In an example, the photonic crystal array pattern can be formed via imprint, electron-beam lithography, or using another patterning technique (e.g., a photonic patterning technique such as two-photon lithography, among others).

In an example, a two-dimensional array pattern can be formed, such as in a transparent medium on a transparent substrate. In an example, the two-dimensional photonic crystal pattern can be used to selectively outcouple specific wavelengths or ranges of wavelengths, of incident optical energy 110 (e.g., ultraviolet, visible, or infrared light, among others). The incident optical energy 110 can be waveguided through the substrate when provided to an input 108 of the waveguide 106 (e.g., focused on or coupled to an aperture of the waveguide 106). Similarly, in an example, a three-dimensional pattern can be formed, such as by laminating or bonding a series of separately-fabricated two-dimensional arrays, among other techniques. In an example, a fiber optic bundle or cable can be coupled to or focused on the input 108, such as including a flattened, drawn, or otherwise formed or shaped waveguide configured to bend the incident optical energy 110 into a desired plane or aperture, such as the input 108 of the waveguide 106.

In the photonic crystal 102, a periodic potential formed by spatial variation in the relative permittivity "$\in_r$," of a medium can interact with electromagnetic radiation resulting in partial or complete photonic bandgaps. The band structure can be determined by one or more of the choice of lattice, the basis formed by the shape and size of the holes (or bars, since an effective permittivity contrast or variation is desired), the thickness of a patterned layer, or the contrast in the spatial variation of the permittivity, "$\in_r$." The energy scale for the band structure can be determined by a lattice constant and the permittivity (or index of refraction).

In an example, the photonic crystal pattern can include two-dimensional square lattice of circular cavities penetrating into the dielectric material of the photonic crystal 102 from a first working surface 104, or one or more other patterns. Other patterns can include one or more patterns including higher orders of symmetry than a square lattice, or one or more patterns symmetric with respect to the input 108 (e.g., to provide a more equal or predictable path for extracted light, to preserve a desired polarization, or to alter the photonic band structure, among others).

For example, the periodicity of the array can be described by a lattice constant describing the spacing between adjacent like lattice site regions in the periodic lattice, such as the illustrative example of a first lattice constant "a" corresponding to the first region 120A, and a second lattice constant "b" corresponding to the second region 120B. The lattice constant can determine the wavelength or wavelengths of electromagnetic outcoupling, such as to extract a first range of wavelengths using the first region 120A of the photonic crystal 102. Similarly, a second range of wavelengths can be extracted from the incoming optical energy 110 using a second region 120B of the photonic crystal 102. In an example, one or more of the first region 120A or the second region 120B can be used to extract more than one range of wavelengths, such as using a superperiodic lattice structure, or including one or more harmonics of the frequency corresponding to the specified first or second lattice constants, "a" or "b."

When the incident optical energy 110 is coupled into the waveguide 106, such as a dielectric waveguide, a periodic transverse potential can exist in proximity to the perimeter of the waveguide 106, such as within or even slightly beyond a cladding material surrounding the waveguide (or air, if the waveguide is not clad). The transverse component of the wavevector corresponding to the optical energy 110 propagating through the waveguide can be scattered by a reciprocal lattice vector provided by the photonic crystal 102, allowing the photonic crystal to extract a desired portion of the optical energy from the waveguide within a specified (e.g., desired) range of wavelengths, determined at least in part by the lattice constant. In an example, the basis and the index of refraction of the material in which the photonic crystal pattern is formed can determine the strength of this wavelength-selective outcoupling, such as when the crystal pattern presents a contrasting effective permittivity as compared to other regions surrounding the waveguide 116.

A complete photonic bandgap can be avoided in the ranges of wavelengths of interest, such as to avoid entirely disrupting propagation within the waveguide 106, or to avoid strongly coupling guided modes out of the waveguide 106. Instead, a partial bandgap can be provided, such as by adjusting one or more of a depth or fill factor of individual cavities, bars, or apertures that can be included in the periodic array, or by adjusting the lattice pattern (e.g., using a hexagonal pattern, a square pattern, or one or more patterns), such as in the first or second regions 120A-B, resulting in weak coupling (e.g., "leaky mode coupling") of the optical energy 110 in the desired ranges of wavelengths provided by the first and second regions 120A-B of the photonic crystal 102. For example, the photonic crystal 102 can be made thin with respect to the waveguide, such as to perturb a boundary field distribution around the waveguide 106. For a square lattice of round cavities, the fill factor can be represented as "r/a," where the "r" is the radius of a round cavity that can be included in the array, and "a" is the lattice constant. In this way, an array of such patterns can be used to create spatially-resolved wavelength-selective outcoupling, which can then be directed toward an optical detector. One or more of the waveguide 106 or photonic crystal 102 can be made of polycarbonate, Poly (methyl methacrylate) ("PMMA"), epoxy, glass, quartz, or fused silica, among others.

Figure 2:
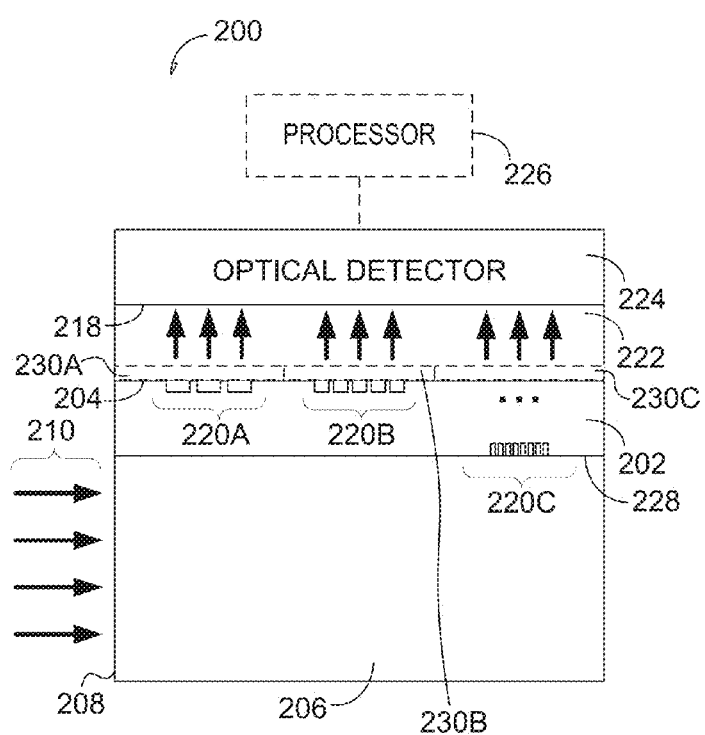
FIG. 2 illustrates generally an example of an apparatus that can include a waveguide, a photonic crystal, a coupling layer, and an optical detector.

FIG. 2 illustrates generally an example of an apparatus 200 that can include a waveguide 206, a photonic crystal 202, a coupling layer 222, and an optical detector 224. One or more of the structures of FIG. 2 can be similarly fabricated or used as described elsewhere, such as with respect to the examples of FIG. 1A-B, or 2-5. In an example, the optical detector 224 can include an optical imaging detector configured to receive information indicative of one or more of wavelength, position, or intensity of optical energy, such as coupled to the optical detector 224 via the coupling the layer 222. Such optical imaging detectors can include one or more of a charge-coupled device ("CCD"), a complementary-metal-oxide-semiconductor ("CMOS") image detector, or one or more other optical detectors. As similarly discussed above, incident optical energy 210 can be focused or provided to an input 208 of the waveguide 206, and optical energy corresponding to a first range of wavelengths can be extracted using a first region 220A of the photonic crystal 202, such as provided by a periodic array of features on a first working surface 204 of the photonic crystal 202. Similarly, optical energy corresponding to a second range of wavelengths can be extracted using a second region 220B of the photonic crystal 202, such as provided by a periodic array of features in the second region 220B on the first working surface 204 of the photonic crystal 202.

In an example, the coupling layer 202 can include one or more features to provide a specified numerical aperture with respect to incident optical energy coupled from the photonic crystal to the coupling layer. The numerical aperture, "NA," can be represented as "n sin θ," where n can represent the index of refraction of the coupling layer, and θ can represent an angle of incidence with respect to a line normal to input surface or aperture.

Not all optical energy scattered by the photonic crystal 202 can be received by the optical detector. A response function (e.g., a detected intensity distribution with respect to wavelength) corresponding to a particular detected region of the photonic crystal (e.g., the first or second regions 220A-B) can be determined in part by the numerical aperture at the interface between the photonic crystal and the optical detector. Thus, the coupling layer 222 can be configured to provide a desired NA to shape the resulting response function for a particular application. If a very narrow range of wavelengths are of interest (e.g., a particular emission line, or a particular one or more individual wavelengths), a narrow aperture can be used to provide a sharp peak in the response function at the desired wavelength to be detected. Similarly, if a broad spectrum is to be measured, a broader range of overlapping response functions can be used, such as to provide desired coverage of a wide range of frequencies using a reasonable number of detection cells or regions on the photonic crystal 202.

In an example, a two (or three) dimensional array of features can be formed on or near a second working surface 228 of the photonic crystal 202, such as when the photonic crystal 202 is fabricated prior to assembly with the waveguide 206. In this example, a third region 220C can extract optical energy including a specified range of wavelengths from the waveguide 206. In this manner, an areal density of the photonic crystal 202 can be increased since both sides of the crystal 202 can be used for extraction of optical energy from the waveguide. In an example, the optical detector 224 can be coupled to a microlens array, such as to focus selected or specified pixels respectively on or near the first working surface 204 of the crystal 202, or the second working surface 228 of the crystal 202.

In an example, one or more of a non-linear optical region, a phosphor, a fluorophore, a charge-discharge material, an organic dye, an organic crystal, or a quantum dot region can be used to filter or convert optical energy from a first range of wavelengths to a second range of wavelengths. For example, in a photonic crystal 202 including patterns on both the first and second working surfaces 204, 228, optical energy extracted from the first working surface 204 can be converted to a first range of wavelengths such as using a first or second conversion region 230A-B. In this example, a third conversion region 230C can be used to convert optical energy extracted by pattern in the third region 220C of the photonic crystal 202 to a second range of wavelengths. In this manner, the detector 224 can discriminate between optical energy extracted by the patterns on the first working surface 204, and the energy extracted by the patterns on the second working surface 228, using wavelength-based discrimination. For example, since the frequency content of the incident energy 210 has been spatially resolved across the array, the location of detected energy can be used to determine respective wavelengths included in the incident energy 210, and the wavelength of detected energy (e.g., provided after conversion) can be used to determine whether the first working surface 204 or the second working surface 228 provided the detected energy.

In an example, the incident optical energy 210 to be analyzed can include optical energy at the edge of or outside a range of wavelengths detectable by the optical detector 224. For example, when the optical detector 224 includes a CCD, such devices are usually sensitive to a range of free-space wavelengths from around 400 nanometers to around 1100 nanometers. Thus, if the incident optical energy 210 includes ultraviolet ("UV") energy, such as in the range of 300-400 nanometers, such energy may not be detectable by the CCD (e.g., a silicon CCD). As discussed above, since the wavelength information about the incident energy 210 is encoded spatially across the photonic crystal 202, the incident non-detectable energy can be downconverted to a more easily-detectable range of wavelengths. For example, the coupling layer 222 can include a relatively uniform conversion material across the top working surface of the crystal 202 (e.g., charge-discharge material). In a charge-discharge material example, the conversion material can be excited to achieve a desired population inversion, and then incident energy 210 can be provided to selectively discharge (e.g., deactivate) portions of the charge-discharge material above regions in the photonic crystal corresponding to various ranges of wavelengths extracted from the incident energy 210, resulting in detectable secondary emission at a lower frequency (e.g., a longer wavelength). Even though the emitted light from the first working surface 204 of the crystal 202 can be almost monochromatic after downconversion, the wavelengths of the incident energy 210 can still be determined using the position of the detected optical energy, as above.

In an illustrative example, such techniques can be used to perform spectral or photometric analysis on the emissions of UV sources, such as an UV LED, a plasma, or one or more other sources, using an inexpensive silicon CCD as the optical detector 224. For example, quartz optics can be used if UV energy is to be coupled into the waveguide 206, and extracted via the crystal 202, since quartz can provide acceptable transmission characteristics at UV frequencies.

In an example, a bleachable dye can be placed either upstream (e.g., more toward the input 208) or downstream of the photonic crystal (e.g., between the first working surface 204 and the second working surface 218, such as in one or more of the regions 230A-C), such as to downconvert a portion of the incident energy 210, such as before or after extraction by the crystal 202.

In an example, certain frequencies of interest that can be included in the incident energy 210 may be too low to be reliably detected (e.g., having too long a wavelength, or outside the bandgap of a semiconductor optical detector). In such examples, a non-linear optical material, among others, can provide a frequency doubling (e.g., second harmonic coupling) effect to upconvert the incident energy 210 to a detectable range of wavelengths, such as before coupling into the waveguide 206, or after extraction by the photonic crystal 202. Such frequency doubling, or other upconversion can be used, for example, to move mid-infrared frequencies into a range of wavelengths detectable by a silicon CCD, among others (e.g., after extraction via the crystal 202 and using a non-linear optical material, a phosphor, a fluorophore, or other material in one or more conversion regions 230A-C).

In an example, a processor 226 can be electrically or optically coupled to the optical detectors, such as to receive information detected by the optical detector 224. The information can be indicative of one or more of the position, intensity, or wavelength of optical energy detected by the optical detector 224. In an example, the processor 226 can be configured to provide an estimate of the spectrum of the incident optical energy 210 at least in part using the information provided by the optical detector, such as one or more spectral estimates as shown in the illustrative example of FIG. 8.

Figure 3:
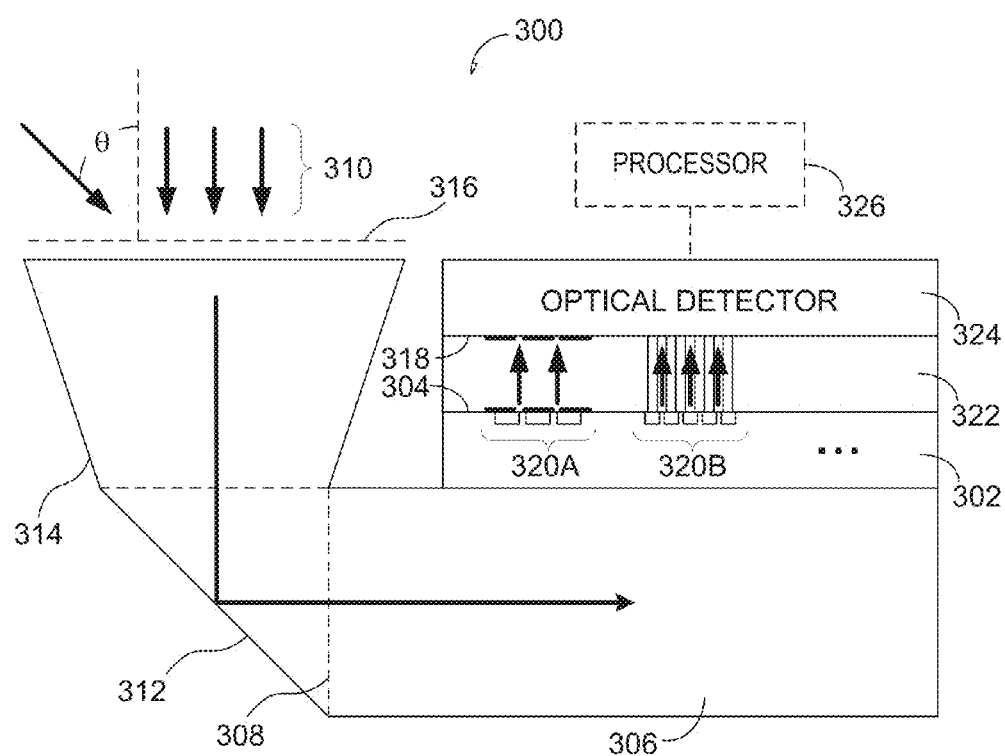
FIG. 3 illustrates generally an example of an apparatus that can include an input structure coupled to a waveguide, a photonic crystal, a coupling layer, and an optical detector.

FIG. 3 illustrates generally an example of an apparatus 300 that can include an input structure coupled to a waveguide 306, a photonic crystal 302, a coupling layer 322, and an optical detector 324. The apparatus 300 can be configured, fabricated, or used such as according to one or more of the examples discussed elsewhere with respect to FIGS. 1A-B, and FIG. 2. In FIG. 3, the input structure can include one or more of a prismatic portion 314, or a mirror 312 (e.g., a prismatic mirror or other reflecting structure), such as to bend incident optical energy 310 from an incident plane 316 into an input plane 308 of the waveguide 306. In example, the prismatic portion 314 can couple optical energy 310 incident less than or equal to a specified angle, such as "θ," with respect a line normal to the input plane 316 of the prism. In an example, other optics can be used such as to focus or direct optical energy 310 toward or onto the input of the prism 314, such that a portion of the incident optical energy 310 will bend and propagate through the waveguide 306. In this manner, certain dimensions of the apparatus 300 can be further reduced in size as compared to apparatus lacking an input structure configured to bend the incident optical energy 310.

In an example, one or more of the prismatic portion 314 or the mirror 312 can include a filter (e.g., a multi-layer optical filter, or a dye filter, among others) or a non-linear optical element, such as to provide frequency conversion, order sorting or order reduction of incoming optical energy. Such order sorting can limit the range of frequencies of the incident optical energy 310 to a range of about an octave or less, such as to avoid aliasing. However, the apparatus 300 need not use order sorting. In an illustrative example, a first region 320A can be sensitive to a wavelength of 400 nanometers, and a second region 320B can be sensitive to a wavelength of 800 nanometers (e.g., 2×400 nanometers). Without order sorting, if the incident energy 310 includes 400 nanometers, both the first region 320A and the second region 320B can extract energy at 400 nanometers from the waveguide 306. An aliasing problem can occur if only the second region 320B is monitored, resulting in an inability to distinguish between detected outcoupled energy corresponding to 400 nanometers and 800 nanometers. However, due to the nature of the crystal array, the first region 320A can also be monitored and used to compensate. For example, the intensity contribution of the 400 nanometers energy in the second region 320B can be subtracted from the detected response in the second region 320B, such as using a value proportional to the 400 nanometers response detected over the first region 320A, since 400 nanometers incident energy will outcouple at both the first and regions 320A-B. For example, the apparatus can be coupled to a processor 326 configured to receive information about the location and intensity of optical information provided by the photonic crystal 302, such as to compensate for aliasing of incoming optical energy, thus eliminating a need for order sorting. If the incident energy 310 includes 800 nanometers, only the second region 320B can extract energy at 800 nanometers from the waveguide 306 and thus such an aliasing problem does not occur.

In an example, the coupling layer 322 of FIG. 3 can include one or more features such as shown or discussed above in the examples of FIG. 2 (e.g., filtering, upconverting, or downconverting features, among others). In the example of FIG. 3, the coupling layer 322 can include one or more features to provide a specified numerical aperture, as discussed above, for incident outcoupled energy from a first working surface 304 of the crystal 302. In an illustrative example, FIG. 3 includes a coupling layer comprising optically opaque coatings such as on or near the first working surface 304, and a second working surface 318, such as in the region 320A. For example, the optically opaque coatings can be opaque to optical energy coupled toward the optical detector 324 from the photonic crystal 302. The first and second coatings can include an array of apertures or etched portions such that optical energy can be transmitted through the coupling layer when incident within a specified range of angles with respect to the coupling layer. As discussed in FIG. 2, such aperture control can be used to adjust the shape of one or more response functions such as associated with one or more patterned regions in the crystal 302 array. In another illustrative example, the coupling layer 322 can include one or more of a microchannel plate or a fiber bundle, such as shown schematically in the region 320B. Such a fiber bundle can include one or more fused or clad fiber optic bundles or plates such as provided by Schott AG, Germany. The fiber bundle or microchannel plate can include an array of aligned fiber-optic or waveguiding elements configured to provide a specified numerical aperture (e.g., to couple light incident within a specified range of angles between the crystal 302 and the optical detector 324). Such a plate or bundle can eliminate a need to focus the optical detector 324 on the crystal 302, thus potentially allowing reduction of the z-height of the apparatus 300 as compared to an approach using focusing optics between the detector 324 and the crystal 302. One or more of the structures shown in FIG. 3 can be fabricated simultaneously (e.g., molded, patterned, imprinted or the like), or the structures can be separately fabricated out of similar or different materials and assembled (e.g., glued, pressed, laminated, cemented, or otherwise coupled optically and mechanically using one or more techniques). For example, the photonic crystal 302 pattern can be imprinted or otherwise included on a portion of the waveguide 306 material itself.

Figure 4:
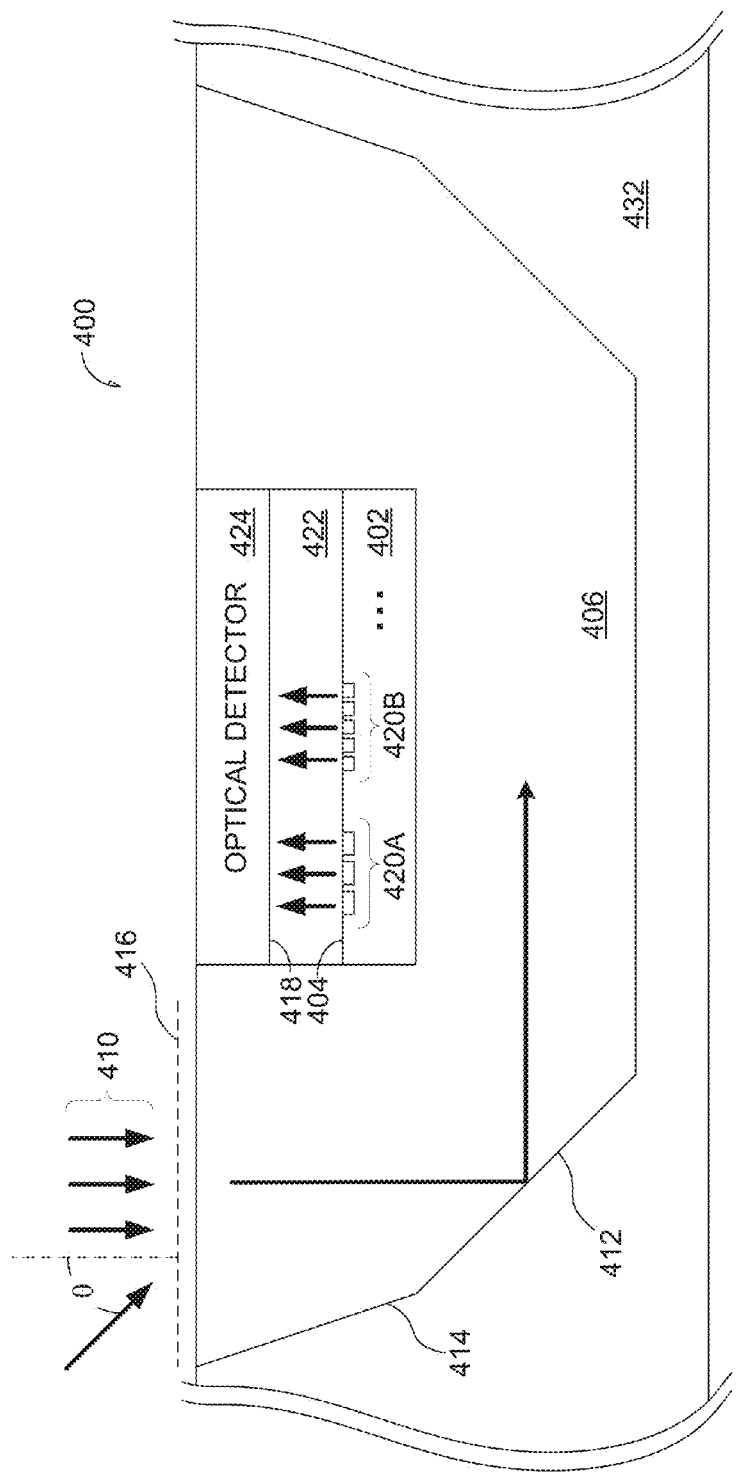
FIG. 4 illustrates generally an example of an apparatus that can include a dielectric slab waveguide, a photonic crystal, a coupling layer, and an optical detector integrated on a commonly-shared substrate.

FIG. 4 illustrates generally an example of an apparatus 400 that can include a dielectric slab waveguide 406, a photonic crystal 402, a coupling layer 422, and an optical detector 424, such as integrated on or within a commonly-shared substrate 432. In an example, the dielectric slab waveguide 406 can be a combination of the input structure and waveguide such as shown and discussed above in the examples of FIG. 3. The apparatus 400 can be configured, fabricated, or used such as according to one or more of the examples discussed elsewhere with respect to FIGS. 1A-B, and FIGS. 2-3. In this example, incident optical energy 410 can be coupled into the dielectric slab 406, such as in regions laterally offset from any or all sides of the crystal 402, coupling layer 422, or detector 424. Similar to the example of FIG. 3, in FIG. 4, incident optical energy 410 within a specified angle, such as "θ," with respect a line normal to the input plane 416, can be coupled into a prismatic portion 414 of the slab 406, such as reflected by a mirror 412. In an example, the photonic crystal can be realized as a pattern imprinted or otherwise fabricated on the waveguide itself (e.g., including cavities in or "bars" formed out of the waveguide dielectric material itself), such as using an otherwise similar apparatus as shown in the examples of FIGS. 1A-B, and FIGS. 2-4. In example, optical energy from multiple sources, such as physically separate sources, can be combined using one or more optical couplers or waveguides, and a composite of optical energy from the various sources can be provided as the input energy 410. Moreover, in such composite examples, the waveguide 406 itself can be used to mix the energy from multiple sources within the structure of the apparatus 400, or using one or more other structures as shown in the examples of FIGS. 1A-B, and FIGS. 2-3.

Figure 5:
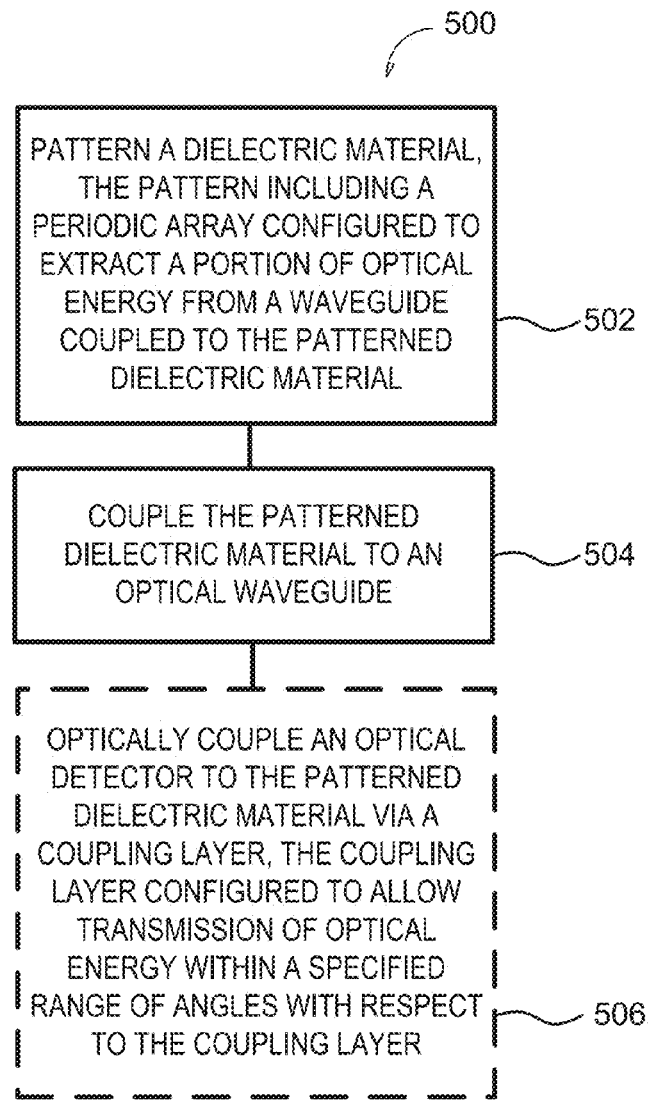
FIG. 5 illustrates generally an example including patterning a dielectric material, coupling the patterned dielectric material to a waveguide, and optically coupling an optical detector to the patterned dielectric material via a coupling a layer.

FIG. 5 illustrates generally an example 500 including patterning a dielectric material, coupling the patterned dielectric material to a waveguide, and optically coupling an optical detector to the patterned dielectric material via a coupling a layer. At 502, a dielectric material can be patterned to include a periodic array configured to extract a portion of optical energy propagating through a waveguide coupled to the patterned dielectric material. At 504, the dielectric material can be coupled to the optical waveguide (e.g., the dielectric material can be fabricated separately from the waveguide, and later mechanically affixed or attached to the waveguide). In an example, the resulting optical assembly can be provided to a user for coupling to an input and an optical detector such as via one or more of focusing optics or a fiber optic technique. In an example, at 506, an optical detector can be optically coupled to the patterned dielectric material via a coupling layer, the coupling layer configured to allow transmission of optical energy from patterned dielectric when the energy is incident within a specified range of angles with respect to a line normal to the plane of the coupling layer. The example of FIG. 5 can provide a method of fabricating one or more of the examples of FIGS. 1A-B, and FIGS. 2-4, at least in part.

Illustrative Examples

One or more portions of the examples discussed elsewhere with respect to FIGS. 1A-B, and FIGS. 2-4 can be fabricated using one or more of polycarbonate, Poly(methyl methacrylate) ("PMMA"), glass, quartz, or fused silica, among other materials. Such portions can include one or more of a prismatic input portion, a mirror, a waveguide (e.g., a dielectric slab, among others), a photonic crystal, a coupling layer (or a portion of a coupling layer), or a surrounding substrate, among other portions of the apparatus of FIGS. 1A-B, and FIGS. 2-4.

In an example, the photonic crystal pattern can be created by forming a polymethylmethacrylate (PMMA), epoxy, or other desired layer on a glass or other substrate that is substantially transparent to the incident electromagnetic energy at the wavelengths of interest. In an illustrative PMMA example, a glass substrate can be cleaned, then PMMA (e.g., type 495K molecular weight, A6 (e.g., 6% dilution in anisole)) can be spun-on such as at 3000 rpm for 45 seconds, and then baked. An 8-10 nanometer thick gold layer can then be sputtered onto or otherwise formed on the PMMA. Electron-beam lithography (EBL) patterning can be used (e.g., at a dose of 320 µC/cm$^2$), the gold can be removed, and the PMMA can be developed, such as for 60 seconds in 1:3 methyl isobutyl ketone (MIBK):isopropyl alcohol (IPA) mixture, then rinsed in IPA. In an illustrative PDMS imprinting example, a master can be formed, such as by using EBL. From the master, a PDMS mold can be cast. The PDMS can be pulled off from the master, to yield a PDMS mold. The mold can be pressed onto a desired substrate, such as with an imprint medium (e.g., Dymax OP-4-20658 diluted 1:4 in propylene glycol methyl ether acetate (PGMEA)). This can be exposed to ultraviolet (UV) radiation, e.g., for 5 minutes, followed by baking for 20 minutes at 80 degrees C. The PDMS can be peeled off, yielding an imprinted substrate.

A spectrometer, photometer, or spectrophotometer including a photonic crystal can have various applications, such as including one or more of the apparatus or fabrication methods of FIGS. 1A-B, and FIGS. 2-5. For example, such applications can include plasma monitoring, such as in-chamber to monitor one or more of a color distribution or an intensity distribution (e.g., to determine a species included in the plasma, or to detect a phase or state of process activity, such as an etching process completion). In an example, a difference, ratio, or some other absolute or relative indication of information obtained about two or more fluorescences or other sources of emission can be used to determine at least one of a presence, amount, or absence of one or more gaseous species, such as oxygen or carbon dioxide. In an example, such fluorescences or emissions can be monitored with respect to time (e.g., sampled), and a difference, ratio, or some other absolute or relative indication of information can be obtained, such as a difference in an intensity of a single fluorescence or emission versus time (e.g., during a decay in emission), or a difference between two or more fluorescence intensities with respect to each other, versus time. For example, a difference, ratio, or other relative indication of intensity corresponding to two or more wavelengths can be determined at multiple points in time, and a difference in such a relative indication over time can be used to determine a presence, amount, or absence of one or more gaseous species. In an example, using a relative indication of information obtained corresponding to two or more different wavelengths can reduce or eliminate an unwanted bias due to drift in absolute measurements as may occur over time as the photonic crystal or detector ages.

In an example, an application can include using a spectrometer, photometer, or spectrophotometer including a patterned crystal configured to sense a particular emission line or emission spectrum.

In another example, spectral composition can be determined such as for determining color accuracy, color content, a color rendering index, or the like. For example, a color rendering index can be determined using a 10-dimensional wavelength space. In such a color rendering index detection example, a patterned photonic crystal can be configured to sense optical energy corresponding to each of the 10-dimensions in the color model, among other examples.

In an example, a color composition (e.g., a chromaticity) can be determined such as using a two-dimensional wavelength space (e.g., a linear CIE1931 "xy" space, or other two-dimensional space), such as using a processor to map the wavelength-dependent spectral responses of various portions of the photonic crystal array to the two-dimensional wavelength space (or to some other space having a desired number of dimensions). For example, the spectral composition of an unknown (or reference) sample can be measured in its particular environment (e.g., including measurement of a spectral response of the sample under a specified or ambient illumination, or incorporating the sample's reflectivity). In such an example, the spectral response obtained by the photonic crystal and detector can then be mapped to a desired color space (e.g., a linear two-dimensional color space). Then, for example, such a mapping can be used to determine a corresponding ratio of tristimulus values matching or approximating the color of the sample, as it would be perceived by an observer. In an example, such tristimulus value ratios can be provided according to a standard color space, such as a CIE1931 "XYZ" color space, or using some other set of trimchromatic parameters. Such CIE1931 color spaces can, for example, correspond to the examples of photometric observers or colorimetric standards specified in joint International Standards Organization (ISO)/International Commission on Illumination (CIE) documents, such as ISO 23539: 2005(E)/CIE S 010/E:2004, entitled "Photometry—The CIE System of Physical Photometry," or ISO 11664-1:2008(E)/CIE S 014-1/E:2006, entitled "Part 1: Standard Colorimetric Observers."

Figure 6:
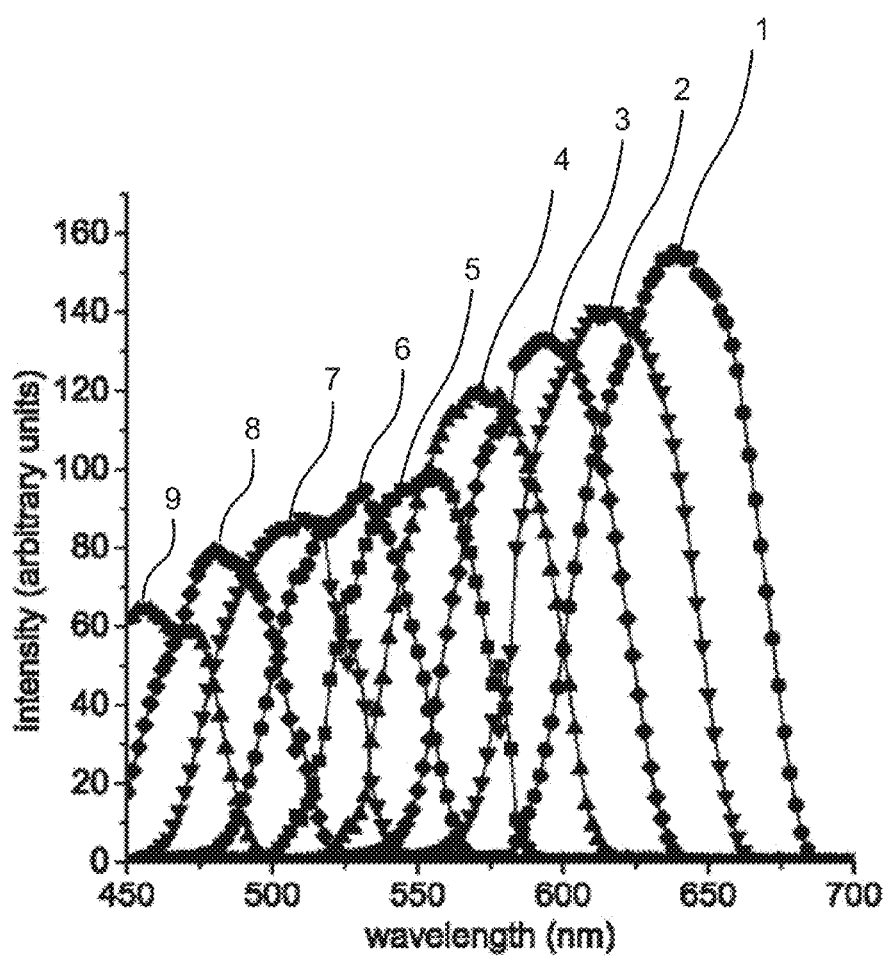
FIG. 6 includes a plot of wavelength-dependent spectral responses for numerical aperture limited light extracted in the normal direction from a substrate including a patterned photonic crystal.
Figure 8:
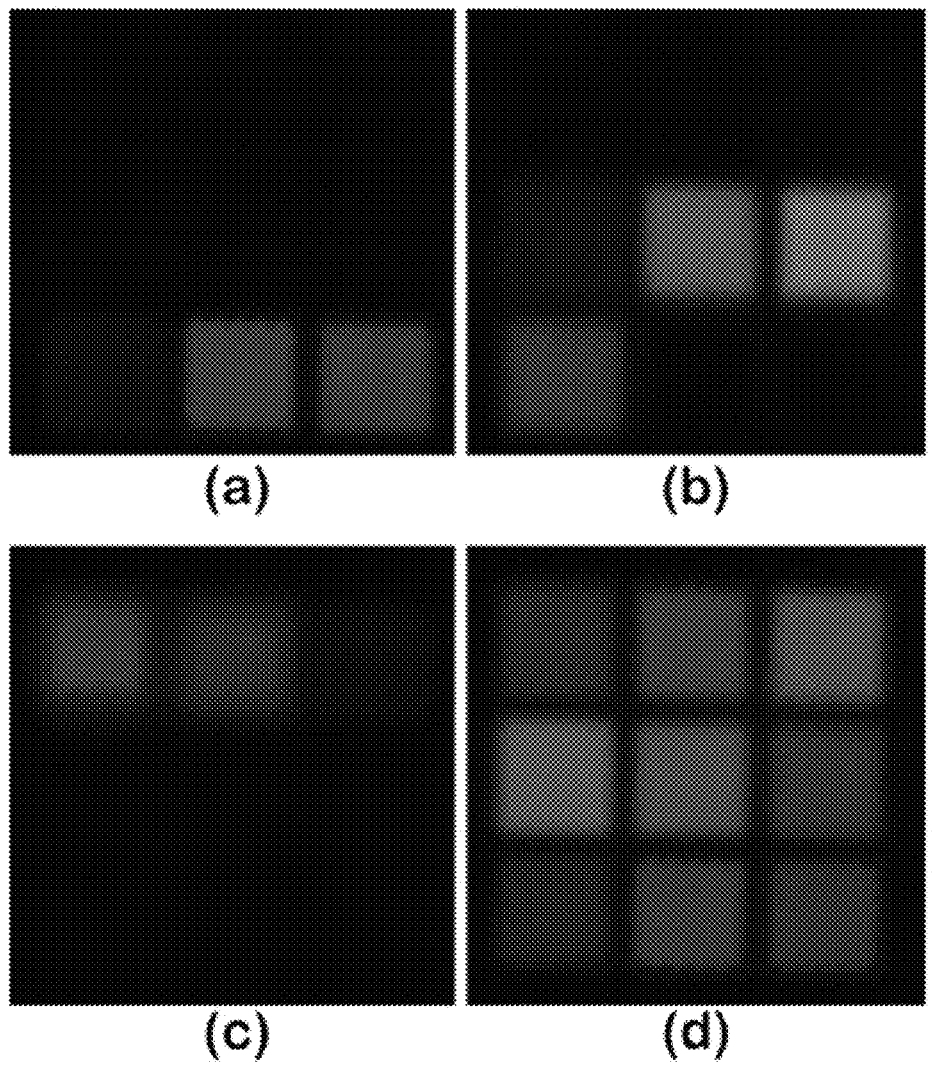
FIG. 8 (color) shows an illustrative example of a pattern response, such as provided by a photonic crystal including a 3×3 array of regions (e.g., a 9 cell array) of patterned features.

FIG. 6 includes a plot of wavelength-dependent spectral responses for numerical aperture limited light extracted in the normal direction from a substrate including various illustrative examples of photonic crystal patterns, such as provided by a 9-cell array similar to the array shown in FIGS. 1A-B, and in the illustrative example of FIG. 8. Responses 1-9 can each correspond to optically detected intensity responses in respective patterned regions on or within a photonic crystal, each region including a specified lattice constant to provide a desired wavelength response peak. Since the response functions overlap, information provided by a detector coupled to the photonic crystal can be used to provide an estimate of an input spectrum across the range of wavelengths provided by the overlapping responses 1-9.

A spectrometer using a photonic crystal can map such intensities in a pattern space to a wavelength space such as using information known about the response functions for each pattern. Using matrix arithmetic, the response of the system can be described as Ax=b, where A can be an m×n matrix including information about the intensities of m patterns at n wavelengths, x can be a wavelength space representation of the input optical energy, and b can be a pattern space representation of the input optical energy (such as corresponding to an intensity pattern detected by an optical detector). The m patterns can peak at different wavelengths (as shown in FIG. 6), A can be full rank and thus its Moore-Penrose pseudoinverse is a valid right inverse, which can be used to solve for the spectral response of the input to provide an estimate of the input spectrum, x. For example, a matrix projection operator can be a function of both the number of pattern elements and the number of wavelengths used to characterize a pattern. Such a projection operator, P, can be represented by $$P = A_{right}^{-1} A;$$

and the recovered spectrum (e.g., an estimate of the spectrum x), can be represented by $$\tilde{x} = A_{right}^{-1} b.$$

Figure 7:
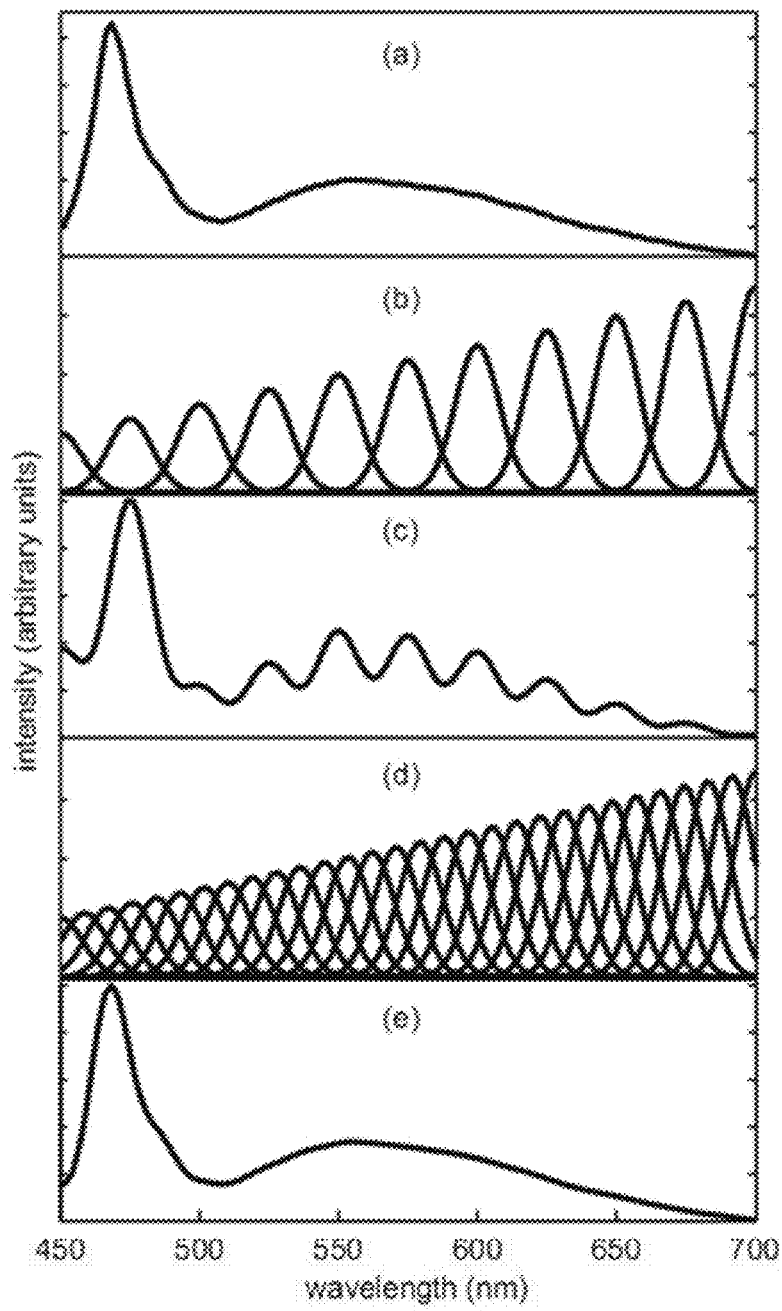
FIG. 7 illustrates generally relationships between spectral response functions of various illustrative examples of photonic crystal patterns used as basis functions to provide a spectral estimate of light provided by a white light emitting diode (LED).

FIG. 7 illustrates generally relationships between spectral response functions of various illustrative examples of photonic crystal patterns used as basis functions to provide a spectral estimate of light provided by a white light emitting diode (LED). Similar to the example of FIG. 6, a plot (b) can represent an array of intensities at various locations on the crystal array. An incident optical energy spectrum can be represented by plot (a), and a plot of an estimated spectrum can be represented by plot (c) (e.g., the input spectrum's projection onto the basis functions of plot (b)). In this illustrative example, the resolution of the spectral estimate can be improved if a greater number of patterned regions are used, providing a greater number of wavelength peaks in a specified range of wavelengths, and with greater overlap of the respective response functions, such as shown in plot (d), and the corresponding projection in plot (e), showing a more faithful reproduction of the input spectrum in plot (a).

FIG. 8 shows an illustrative example of a pattern response, such as provided by a photonic crystal including a 3×3 array of regions (e.g., a 9 cell array) of patterned features as discussed above in the examples of FIGS. 1A-B, such as including response functions for each cell in the array as shown in FIG. 8. In this illustrative example, photo (a) includes a pattern response to a 470 nanometers waveguided light input, photo (b) includes a pattern response to a 530 nanometers waveguided light input, photo (c) includes a pattern response to a 630 nanometers waveguided light input, and photo (d) includes a pattern response to a white light emitting diode (LED) light input.

Various Illustrative Examples that can Include Infrared Applications

A photonic crystal-based spectrometer can be used in high-resolution infrared (IR) applications, such as where moving parts are undesirable. The photonic crystal spectrometer's geometry scales in a different manner than a diffractive grating spectrometer, which can help break the dependency of resolution on the spatial separation between the diffractive element (in this case, the photonic crystal array) and the detector.

Infrared spectroscopy can be used in applications in a wide variety of settings, including industrial, agricultural, scientific, health, and defense-related applications. Due to the ability of infrared spectroscopy to detect chemical signatures of extremely small molecules such as carbon dioxide, it can be used for identification of air and water-born contaminants in defense, law enforcement, and public health applications. Such applications can include rapid and portable biological/chemical analysis and sensing (e.g., for use such as by the United States Department of Defense, the United States Department of Homeland Security, the United States Centers for Disease Control, the United States Food and Drug Administration, the United States Environmental Protection Agency, or other agencies or entities located in the United States or elsewhere), rapid and portable molecular analysis for forensics (e.g., such as for use by the United States Federal Bureau of Investigation, or other state or local law enforcement), or for emissions testing and analysis.

A compact infrared photonic crystal spectrometer can be used to detect wavelengths between about 700 nanometers-14 micrometers (or another range of wavelengths), such as for use in high vacuum environments or at cryogenic temperatures. The photonic crystal spectrometer can use the leaky modes of an array of photonic crystals patterned on a multi-mode waveguide to selectively extract wavelength-specific light such as to a 2D detector array (e.g. an imager). The pattern detected by an imager can be analyzed to reconstruct the spectrum.

For example, the substrate can be transparent to a near-infrared range of wavelengths, such as including wavelengths from less than 700 nanometers to more than 14 micrometers, such as encompassing a majority of a near-infrared range of wavelengths. The substrate can include one or materials such as zinc sulfide, fused silica, silicon oxide, cesium iodide, cesium fluoride, calcium chloride, potassium chloride, thallium bromo-iodide, or that can include one or more other materials.

In an example, the spectrometer can include an optical detector sensitive to the farthest infrared wavelength of interest. Since semiconductor detector materials are sensitive to light of equal or higher energy than their bandgap, and the photonic crystal array converts spectral composition information to spatial location information, a 2-dimensional imager sensitive to the farthest IR wavelength of interest can be used in the photonic crystal spectrometer for wavelengths from the deep IR to the visible. The IR detector can include one or more of a bolometer, a pyroelectric detector, a subband detector, or another IR detector, such as including a solid-state detector. In an example, the use of high quality-factor (Q) photonic crystals in an infrared application can provide enhanced spectral resolution. For example, the Q factor of photonic crystals can be dependent on photonic crystal materials and dimensions.

In an example, the spectrometer can include a layer or structure between or comprising a portion of the photonic crystal or the optical detector, such as for conversion of energy from outside the detector's sensitive range of wavelengths into a region inside the detector's sensitive range such as using one or more of a non-linear optical region, a phosphor, a 15 fluorophore, a charge-discharge material, an organic dye, an organic crystal, or quantum dots.

The present inventors have recognized that using photonic crystal-based spectrometer is different than diffractive grating technologies. For example, the photonic crystals can be arrayed over two dimensions such as including many small patterned regions allowing a single detector to image many patterns. Unlike grating-based technologies, the spectrometer resolution can be independent of the distance between the diffractive elements and the detector. Also, unlike a Fourier transform infrared (FTIR) spectrometer, the photonic crystal spectrometer requires no moving parts. These characteristics also yield a spectrometer with the potential for high vacuum, low temperature, vibration, or particle tolerance, unlike other technologies. The scaling law that governs photonic crystal structures can allow miniaturization of such photonic crystal-based spectrometers; the resulting module size can be constrained by the dimensions of the detector.

The examples discussed above and below can include or can use apparatus or techniques, such as discussed above with respect to the examples of FIGS. 1A-B, FIGS. 2-6, FIG. 7, or FIG. 8.

Figure 9:
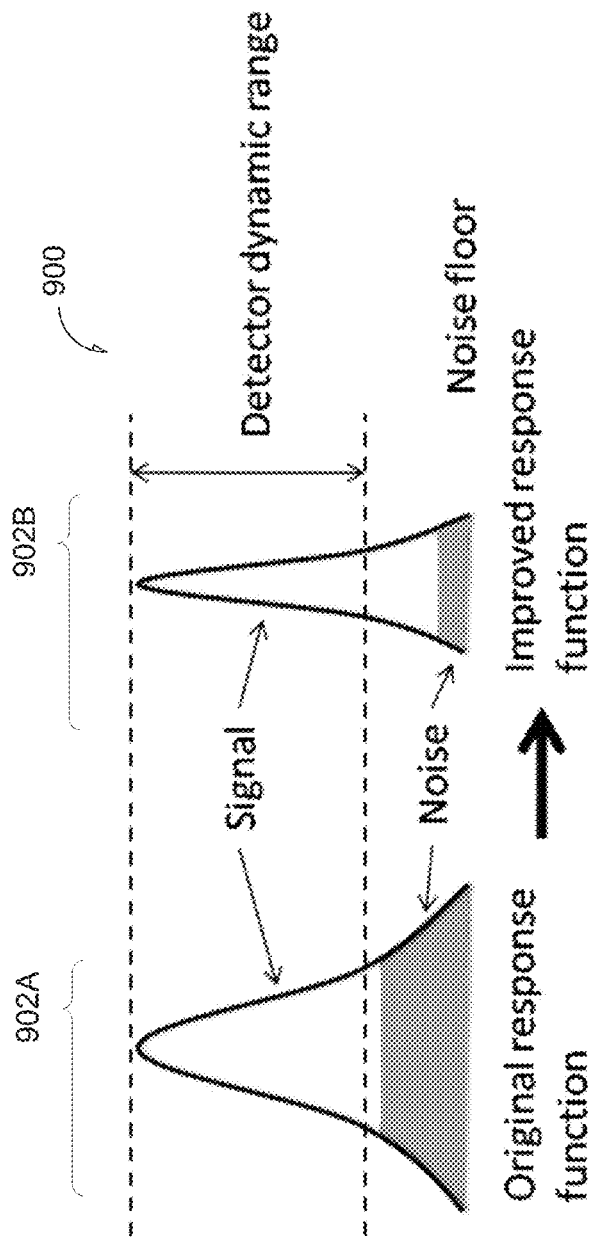
FIG. 9 illustrates generally an illustrative example of a comparison between photonic crystal pattern response functions.

FIG. 9 illustrates generally an illustrative example 900 of a comparison between photonic crystal pattern response functions, including a first response function 902A, and a modified response function 902B. The response curves discussed above, such as in the examples of FIGS. 6-7, can be narrowed such as to provide improved extraction efficiency or response function quality factor, as shown in the example of FIG. 9. For example, a quality factor can be increased, or a signal-to-noise ratio can be decreased, via material selection, photonic crystal array layout, or a reduction of the numerical aperture of the optics between the photonic crystal array and detector. In an example, an increase in quality factor can improve a signal to noise ratio, such as for coupling to a detector having a fixed dynamic range. Such an increase in quality factor, or decrease in signal-to-noise ratio can reduce an integration time used during detection, such as providing an improvement in detection speed or an enhancement in a frequency resolution of detection.

Figure 10:
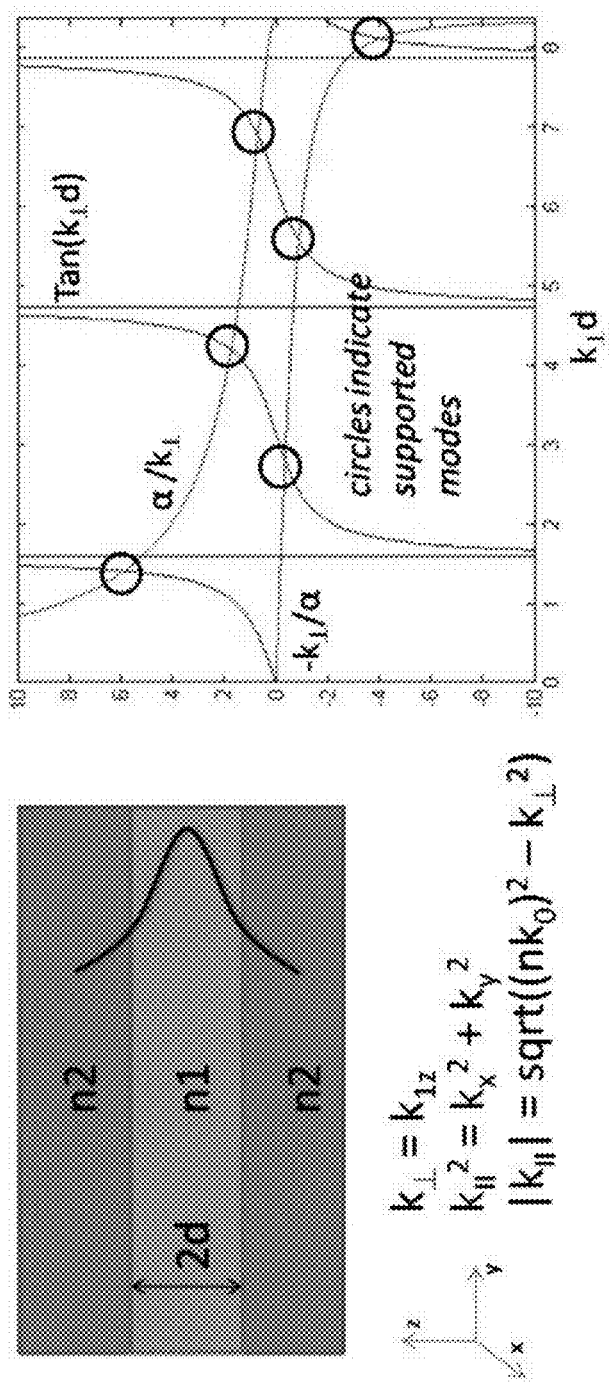
FIG. 10 illustrates generally an example of propagating modes in a slab waveguide.
Figure 11:
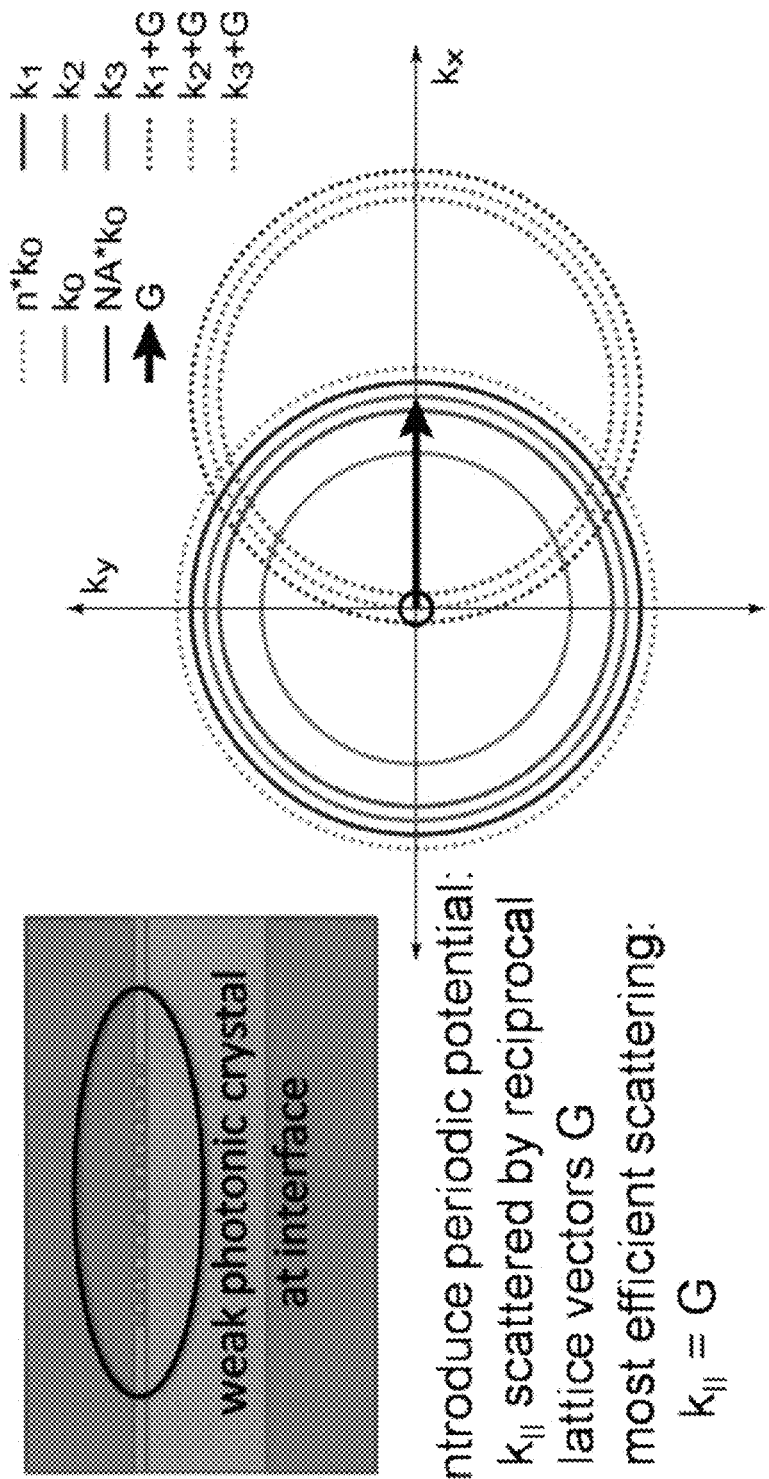
FIG. 11 illustrates generally an example of scattering of waveguide modes by a photonic crystal at an interface.

FIG. 10 illustrates generally an example of propagating modes in a slab waveguide. FIG. 11 illustrates generally an example of scattering of waveguide modes by a photonic crystal at an interface. As discussed above, wavelength selective extraction in a photonic crystal fabricated on top of an optical waveguide can occur because the presence of the photonic crystal can alter the phase matching at an interface between the optical waveguide and free space (or another dielectric material that contrasts with the optical waveguide).

Introduction of a periodic potential variation scatters guided wavevectors by reciprocal lattice vectors that can be represented by "G" into extracted wavevectors, such as illustrated in FIG. 11. The range of wavelengths extracted by a photonic crystal pattern can be determined at least in part by the lattice constant of the pattern or the modes supported by the waveguide. In an illustrative example, a thick glass coverslip supporting thousands of modes can be used as a waveguide, simplifying the design relationship between peak extraction wavelength and lattice constant. The range of wavelengths imaged at the normal by the camera can be a subset of the extracted wavelengths, such as determined by the numerical aperture of the optics interfacing the camera with the photonic crystal array.

The present inventors have recognized, among other things, that adapting the photonic crystal spectrometer concept from visible wavelengths to IR wavelengths can include scaling up the photonic crystal dimensions (as compared to the dimensions use for extraction of visible light), using a different material for the patterned waveguide, or using a different optical detection technique (e.g., a different detector).

In an example including an IR spectrometer, factors that can influence performance can include the index of refraction and resulting index contrast in the patterned region. A relatively high index contrast is desirable for an IR spectrometer application. Materials suitable for transmission of 1-14 micrometers can include zinc sulfide, potassium chloride, potassium bromide, silicon oxide, fused silica, silver chloride, silver bromide, thallium bromo-iodide, calcium chloride, cesium fluoride, and cesium iodide, for example.

In a photonic crystal coupled to an optical waveguide, a periodic potential formed by spatial variation in the relative permittivity of a medium interacts with electromagnetic radiation allowing for scattering by reciprocal lattice vectors, which in turn leads to the extraction of a specified range of wavelengths of light. The band structure can be determined by the choice of lattice, the basis of such a lattice formed by the shape and size of the features included in a patterned array, the thickness of the patterned layer including the array, or the contrast in the spatial variation. For example, the energy scale for the band structure can be set by the lattice constant. Using such parameters, a photonic crystal can be configured for extraction of 1-14 micrometer radiation (or some other desired range of wavelengths), such as including response functions appropriate determination of an unknown input spectrum at a wavelength of about 0.1 micrometers or finer.

Figures 12A, 12B:
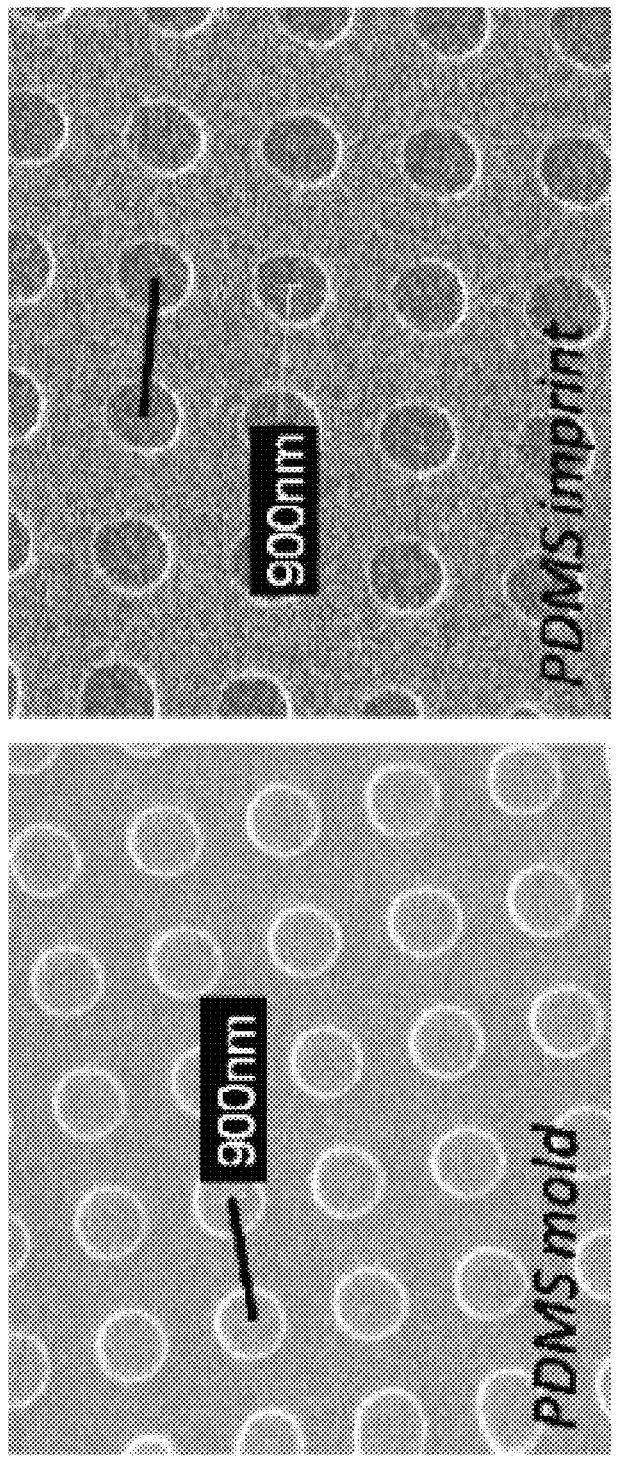
FIGS. 12A-B illustrate generally SEM images of a polydimethylsiloxane (PDMS) mold in FIG. 12A and imprint of a photonic crystal pattern in FIG. 12B, such as for 1.35 micrometer wavelength extraction.

FIGS. 12A-B illustrate generally SEM images of a PDMS mold in FIG. 12A and imprint of a photonic crystal pattern in FIG. 12B, such as for 1.35 micrometer wavelength extraction. In an example, a fabrication process for the photonic crystal patterns compatible with substrate materials, such as discussed above, can include photolithography, electron beam lithography (EBL), or nanoimprint lithography (NIL), or one or more other fabrication techniques. For example, a pattern can etched into the substrate or created in an adjacent material layer above the substrate. The processes employed can depend on the substrate chosen as various materials exhibit differing degrees of sensitivity to light, humidity, and process chemicals.

In an example, a fabrication process for a photonic crystal can include a PDMS stamping process, such as to provide one or more features with a 900 nanometer lattice constant, such as on glass, such as for extraction of 1.35 micrometer light, as shown in the illustrative example of FIG. 12A. Such a stamping process can be used to provide the photonic crystal pattern shown in FIG. 12B.

Figures 13A, 13B:
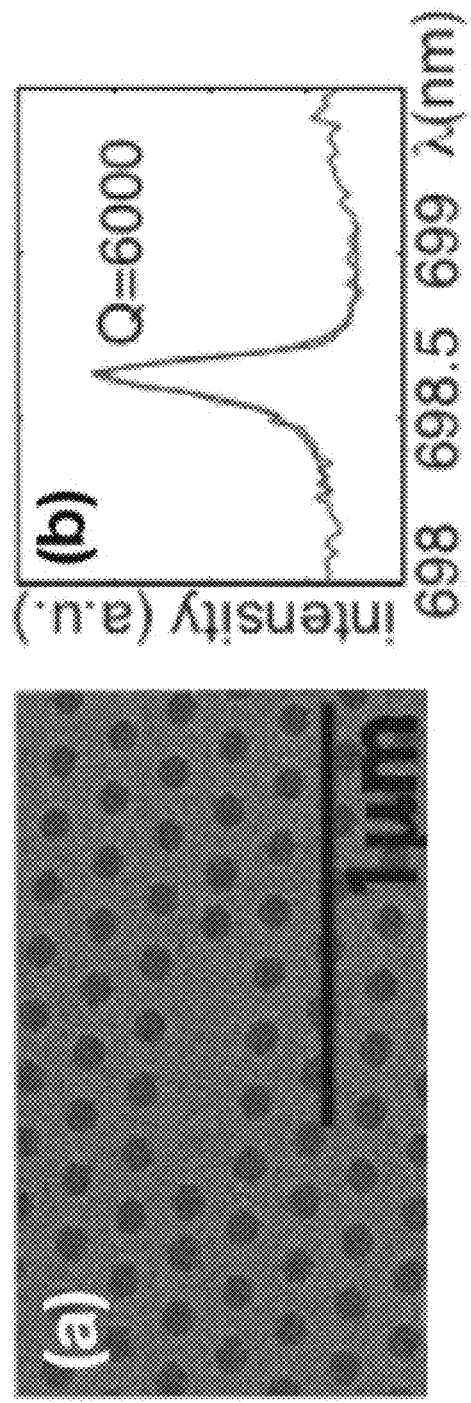
FIGS. 13A-B illustrate generally SEM images of a Gallium Phosphide (GaP) photonic crystal cavity in FIG. 13A, and a broad-band reflectivity measurement of cavity resonance with Q≈6000 in FIG. 13B.

FIGS. 13A-B illustrate generally an SEM image of a GaP photonic crystal cavity in FIG. 13A, and a corresponding broad-band reflectivity measurement of such a cavity resonance showing a quality factor (Q) of approximately 6000 in FIG. 13B. In an example one or more high quality factor photonic crystal cavities can be fabricated, such as using one or more techniques shown in the illustrative examples of FIGS. 12A-B, or FIG. 14, or using other techniques.

Figure 14:
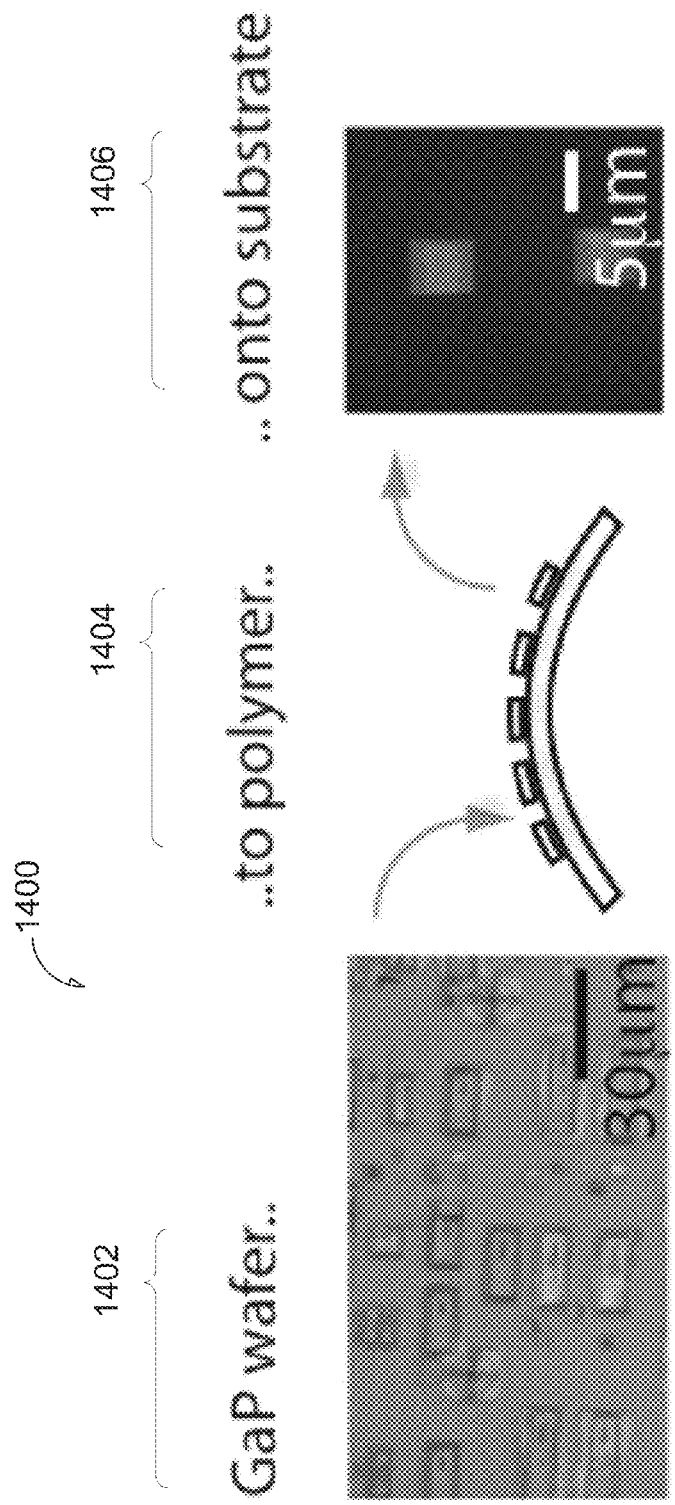
FIG. 14 illustrates generally an example of photonic crystals transferred from a GaP wafer to another substrate such as via PDMS stamping.

FIG. 14 illustrates generally an example, such as a technique, that can include transferring a photonic crystal pattern from a GaP wafer to another substrate, such as using a PDMS stamp, or using one or more other materials. For example, at 1402, a photonic crystal pattern can be fabricated on a first substrate, such as a GaP wafer. A second material, such as PDMS, can be formed on a surface of the first substrate, such as to provide a "stamp" including "pillars" corresponding to the GaP wafer cavity locations. At 1404, the stamp can be lifted off the first substrate, such as for transferring a pattern of cavities on the first substrate onto a second substrate. At 1406, a photonic crystal pattern can be formed on a surface of a second substrate using the PDMS stamp, such as corresponding to the photonic crystal pattern provided on the first substrate.

Figure 15:
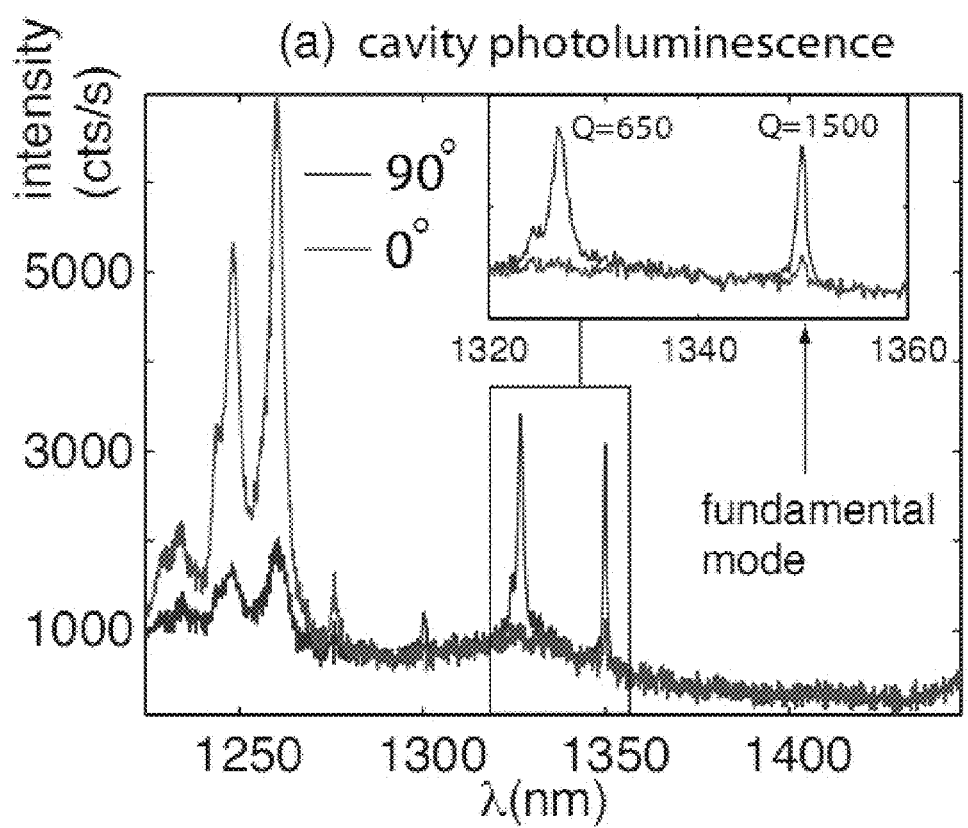
FIG. 15 illustrates generally (GaAs) photonic crystal cavity indicating a linewidth below 1 nanometer in the near-infrared.

FIG. 15 illustrates generally an example of polarization-resolved measurement of a GaAs photonic crystal cavity indicating a linewidth below 1 nanometers in the near-infrared. FIG. 15 illustrates generally the result of a polarization-resolved reflectivity measurement on a device, such as shown in the illustrative example of FIG. 14.

In an example, one or more imaging detectors sensitive to 1-14 micrometers can be included as a portion of the IR photonic crystal spectrometer. Such a detector can include a 2D focal plane array such as including a microbolometer, a photodetector, a pyroelectric detector, or a thermoelectric element. A high-resolution detector need not be used, as sensitivity improves as the size of the patterned regions increases.

In an example, one or components or portions of the IR photonic crystal spectrometer can be characterized such as using one or more of a high-vacuum or low-temperature environment, such as including an analysis of any outgassing provided by the components under test. During development, crystal patterns configured to extract a target wavelength range can be fabricated and characterized such as using a scanning electron microscope (SEM). The response functions of such patterns can be assessed such as using light extraction measurements. For example, a sensitivity can be estimated using light extraction measurements and a calibrated IR photodetector.

In an example, an analysis of the basis formed by the photonic crystal response functions can be used to determine a minimum distance between two delta functions in wavelength that can still allow for them to be resolved as separate entities. In addition to narrowing the response functions (e.g., increasing a quality factor associated with a response function corresponding to a pattern in the photonic crystal), an increased number of response functions can be used such as to increase resolution.

Numerical aperture (NA) can influence response function width. For example, in a spectrometer without imaging lenses, a reduced NA is used as compared to a spectrometer with lenses. In an example, measurements can be made such as using an adjustable iris in the infinity space of an infinity-corrected lens system to assess the impact of NA adjustment on the measured response functions.

In an example, the photonic crystal pattern can extract not only the target wavelengths, but also multiples of the frequencies included in the range of the target wavelengths, thus order sorting taking advantage of such an effect can be used to provide a spectrometer sensitive to a range of wavelengths from 1 micrometer to 20 micrometers, or some other range of frequencies (e.g., spanning more than an octave).

Various Notes and Examples

Example 1 describes subject matter that can include an apparatus. The apparatus can comprise an optical waveguide, a photonic crystal comprising a dielectric material, the photonic crystal located on an exterior surface of the optical waveguide. The photonic crystal can include a first surface including a first array of periodic features on or within the dielectric material, the array extending in at least two dimensions and including an effective dielectric permittivity different from the surrounding dielectric material, and the periodic features can include a specified lattice constant, the periodic features configured to extract a desired portion of propagating optical energy from the waveguide through the photonic crystal, the desired portion determined at least in part by the specified lattice constant.

In Example 2, the subject matter of example 1 can optionally include an array of periodic features comprising a first region having a first lattice constant, the first region configured to extract a first range of wavelengths from the waveguide, and a second region having a second lattice constant, the second region configured to extract a second range of wavelengths from the waveguide.

In Example 3, the subject matter of one or more of Examples 1-2 can optionally include an optical detector optically coupled to the photonic crystal and configured to detect optical energy provided by at least one of the first or second regions, and configured to provide information indicative of the intensity and location of the optical energy provided by at least one of the first or second regions.

In Example 4, the subject matter of one or more of Examples 1-3 can optionally include a processor configured to determine a relative indication of information about an intensity of optical energy provided by the first and second regions.

In Example 5, the subject matter of one or more of Examples 1-3 can optionally include a processor configured to determine an estimate of the spectrum of the optical energy provided at an input to the waveguide, using the information provided by the optical detector about the intensity and location of optical energy provided by at least one of the first or second regions of the photonic crystal.

In Example 6, the subject matter of one or more of Examples 1-5 can optionally include the processor configured to determine at least one of a color rendering index, or a mapping to a two-dimensional color space, of optical energy provided at an input to the waveguide, using information about intensity and location of optical energy provided by at least one of the first or second regions of the photonic crystal.

In Example 7, the subject matter of one or more of Examples 1-6 can optionally include an optical detector comprising one or more of a silicon charge-coupled device ("CCD") or a complementary-metal-oxide-semiconductor ("CMOS") optical detector, one or more of the CCD or CMOS detectors configured to image at least one of the first or second regions respectively using multiple pixels.

In Example 8, the subject matter of one or more of Examples 1-7 can optionally include periodic features comprising a square lattice of circular cavities penetrating into the dielectric material.

In Example 9, the subject matter of one or more of Examples 1-8 can optionally include an optical detector optically coupled to the photonic crystal via a coupling layer located between the photonic crystal and the optical detector, the coupling layer configured to provide a specified numerical aperture with respect to incident optical energy coupled from the photonic crystal to the coupling layer.

In Example 10, the subject matter of one or more of Examples 1-9 can optionally include a coupling layer comprising a first working surface near the optical detector, and a second working surface near the photonic crystal, and wherein the first and second working surfaces include respective coatings that are opaque to the optical energy coupled toward the optical detector through the photonic crystal. In this example, the first and second coatings can include an array of apertures configured to allow transmission of optical energy through the coupling layer when the optical energy is incident within a specified range of angles with respect to the coupling layer.

In Example 11, the subject matter of one or more of Examples 1-10 can optionally include a coupling layer comprising a bundle of fiber optic elements, the fiber optic elements aligned to allow transmission of optical energy through the coupling layer when the optical energy is incident within a specified range of angles with respect to the coupling layer.

In Example 12, the subject matter of one or more of Examples 1-11 can optionally include a coupling layer comprising a microchannel plate configured to allow transmission of optical energy through the coupling layer when the optical energy is incident within a specified range of angles with respect to the coupling layer.

In Example 13, the subject matter of one or more of Examples 1-12 can optionally include a coupling layer comprising one or more of a phosphor or fluorophore material configured to convert at least some of the optical energy extracted by the photonic crystal from a first range of wavelengths to a second range of wavelengths, the optical detector configured to detect converted optical energy within the second range of wavelengths.

In Example 14, the subject matter of one or more of Examples 1-13 can optionally include a coupling layer comprising a non-linear optical material configured to convert at least some of the optical energy provided by the photonic crystal from a first range of wavelengths to a second range of wavelengths, the optical detector configured to detect converted optical energy within the second range of wavelengths.

In Example 15, the subject matter of one or more of Examples 1-14 can optionally include an input structure coupled to the waveguide, the input structure configured to couple optical energy incident within a specified range of angles with respect to an input aperture, the incident optical energy within a specified range of wavelengths.

In Example 16, the subject matter of one or more of Examples 1-15 can optionally include an input structure comprising one or more of a mirror, a fiber optic portion, or a prism.

In Example 17, the subject matter of one or more of Examples 1-16 can optionally include a plane of incident optical energy that is different from a plane of propagation through the portion of the waveguide coupled to the photonic crystal.

In Example 18, the subject matter of one or more of Examples 1-17 can optionally include an input structure comprising a trapezoidal prism coupled to a prismatic mirror, and wherein one or more of the prism or mirror are configured to steer the incident optical energy through a path within the input structure including a bend of about 90 degrees or more.

In Example 19, the subject matter of one or more of Examples 1-18 can optionally include an optical detector optically coupled to the photonic crystal using a coupling layer located between the photonic crystal and the optical detector, the coupling layer configured to provide a specified numerical aperture; and one or more of the waveguide, the input structure, the photonic crystal, the optical detector, or the coupling layer can be co-integrated on or within a commonly-shared substrate.

In Example 20 the subject matter of one or more of Examples 1-19 can optionally include one or more of the waveguide, the input structure, the photonic crystal, or the coupling layer, comprising polycarbonate, Poly(methyl methacrylate) ("PMMA"), glass, quartz, or fused silica.

In Example 21, the subject matter of one or more of Examples 1-20 can optionally include a dielectric medium configured to at least partially surround the optical waveguide in locations other than the location of the photonic crystal, and the effective dielectric permittivity of the dielectric material of the photonic crystal near the optical waveguide can be different from the dielectric permittivity of the dielectric medium surrounding the optical waveguide elsewhere.

In Example 22, the subject matter of one or more of Examples 1-21 can optionally include a photonic crystal comprising a second working surface including a second array of periodic features, the second array of periodic features including an effective dielectric permittivity different from the surrounding dielectric material. In this example, the second periodic features can optionally include a specified lattice constant configured to extract a portion of a propagating optical energy from the waveguide through the photonic crystal, the portion determined at least in part by the specified lattice constant of the periodic features of the second array. In this example, a first filter can be configured to one or more of filter, upconvert, or downconvert the optical energy extracted by the photonic crystal using the first array on the first working surface, the first filter configured to provide a first range of wavelengths, and a second filter can be configured to one or more of filter, upconvert, or downconvert the optical energy extracted by the photonic crystal using the second array on the second working surface, the second filter configured to provide a second range of wavelengths.

In Example 23, the subject matter of one or more of Examples 1-22 can optionally include an optical detector optically coupled to the photonic crystal, the optical detector configured to detect optical energy including at least one of the first or second ranges of wavelengths and configured to provide information indicative of the location, intensity, and wavelength of the received optical energy within at least one of the first or second ranges of wavelengths, a processor configured to receive the information indicative of the location, intensity, and wavelength of the received optical energy within at least one of the first or second ranges of wavelengths, and the processor can be configured to determine an estimate of the spectrum of the optical energy provided at an input to the waveguide, using the information provided by the optical detector about the intensity, location, and wavelength of optical energy provided by at least one of the first or second arrays.

Example 24 can include, or can optionally be combined with subject matter of one or any combination of Examples 1-23 to include, subject matter (such as a method, a means for performing acts, or a machine-readable medium including instructions that, when performed by the machine, cause the machine to perform acts) comprising collecting optical energy using an optical waveguide and extracting a desired portion of propagating optical energy from the waveguide using a photonic crystal comprising a dielectric material, the photonic crystal located on an exterior surface of the optical waveguide, the photonic crystal comprising a first surface including a first array of periodic features on or within the dielectric material, the array extending in at least two dimensions and including an effective dielectric permittivity different from surrounding dielectric material, and the periodic features include a specified lattice constant to determine at least in part a desired wavelength of the extracted portion.

The subject matter of Example 24 can optionally include a means for collecting optical energy using an optical waveguide and a means for extracting a desired portion of propagating optical energy from the waveguide using a photonic crystal comprising a dielectric material, the photonic crystal located on an exterior surface of the optical waveguide.

These examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An apparatus comprising:
an optical waveguide configured to support propagating optical energy in a first direction;
a photonic crystal comprising a dielectric material, the photonic crystal located on an exterior surface of the optical waveguide;
wherein the photonic crystal comprises a surface including an array of periodic features on or within the dielectric material, the array extending in at least two dimensions and including an effective dielectric permittivity different from the surrounding dielectric material;
wherein the periodic features include a specified lattice constant, the periodic features configured to extract a desired portion of the propagating optical energy from the waveguide through the photonic crystal via outcoupling the desired portion of propagating optical energy from a waveguided mode established by the waveguide to a weakly-coupled leaky mode established by the photonic crystal, the desired portion determined at least in part by the specified lattice constant;
wherein the apparatus includes an optical detector optically coupled to the photonic crystal and configured to detect outcoupled optical energy extracted by the array of periodic features; and
wherein a wavelength of detected outcoupled optical energy is established at least in part using information about a location on the optical detector at which the outcoupled optical energy is detected.

2. The apparatus of claim 1, wherein the outcoupled optical energy includes multiple wavelengths optically coupled to a single pixel or an array of pixels on the optical detector.

3. The apparatus of claim 2, comprising a processor configured to discriminate between wavelengths optically coupled to a pixel or an array of pixels on the optical detector.

4. The apparatus of claim 1, comprising a processor configured to determine an estimate of the spectrum of the optical energy provided at an input to the waveguide, using the information provided by the optical detector about the intensity and location of outcoupled optical energy extracted by the array of periodic features.

5. The apparatus of claim 1, comprising a processor configured to determine at least one of a color rendering index, or a mapping to a two-dimensional color space, of optical energy provided at an input to the waveguide, using information provided by the optical detector about the intensity and location of outcoupled optical energy extracted by the array of periodic features.

6. The apparatus of claim 1, wherein the optical detector includes a semiconductor.

7. The apparatus of claim 1, wherein the optical detector includes a thermal detector.

8. The apparatus of claim 1, wherein the optical detector is optically coupled to the photonic crystal via a coupling layer located between the photonic crystal and the optical detector.

9. The apparatus of claim 8, wherein the coupling layer is configured to provide a specified numerical aperture with respect to incident optical energy coupled from the photonic crystal to the coupling layer.

10. The apparatus of claim 8, wherein the coupling layer includes a first working surface near the optical detector, and a second working surface near the photonic crystal, and wherein the first and second working surfaces include respective coatings that are opaque to the optical energy coupled toward the optical detector through the photonic crystal; and
wherein the first and second coatings include one or more apertures configured to allow transmission of optical energy through the coupling layer when the optical energy is incident within a specified range of angles with respect to the coupling layer.

11. The apparatus of claim 8, wherein the coupling layer includes a microchannel plate.

12. The apparatus of claim 8, wherein the coupling layer includes one or more of a phosphor or fluorophore material configured to convert at least some of the optical energy extracted by the photonic crystal from a first range of wavelengths to a second range of wavelengths; and
wherein the optical detector is configured to detect converted optical energy within the second range of wavelengths.

13. The apparatus of claim 8, wherein the coupling layer includes a non-linear optical material configured to convert at least some of the optical energy provided by the photonic crystal from a first range of wavelengths to a second range of wavelengths; and
wherein the optical detector is configured to detect converted optical energy within the second range of wavelengths.

14. The apparatus of claim 1, wherein the apparatus includes an input structure coupled to the waveguide, the input structure configured to couple optical energy incident within a specified range of angles with respect to an input aperture, the incident optical energy within a specified range of wavelengths.

15. The apparatus of claim 14, wherein the input structure includes a mirror.

16. The apparatus of claim 14, wherein the input structure includes a prism.

17. The apparatus of claim 14, wherein the plane of incident optical energy is different from a plane of propagation through the portion of the waveguide coupled to the photonic crystal.

18. The apparatus of claim 17, wherein the input structure includes a trapezoidal prism coupled to a prismatic mirror, and wherein one or more of the prism or mirror are configured to steer the incident optical energy through a path within the input structure.

19. The apparatus of claim 14, wherein the optical detector is optically coupled to the photonic crystal using a coupling layer located between the photonic crystal and the optical detector; and
wherein one or more of the waveguide, the input structure, the photonic crystal, the optical detector, or the coupling layer are co-integrated on or within a commonly-shared substrate.

20. The apparatus of claim 1, wherein a photonic band gap established by the photonic crystal is incomplete.

21. An apparatus comprising:
an optical waveguide configured to support propagating optical energy in a first direction;
an input structure coupled to the waveguide, the input structure configured to couple optical energy incident on the apparatus into the waveguide;
a photonic crystal comprising a dielectric material, the photonic crystal located on an exterior surface of the optical waveguide;
wherein the photonic crystal comprises a surface including an array of periodic features on or within the dielectric material, the array extending in at least two dimensions and including an effective dielectric permittivity different from the surrounding dielectric material;
wherein the periodic features include a specified lattice constant, the periodic features configured to extract a desired portion of the propagating optical energy from the waveguide through the photonic crystal via outcoupling the desired portion of propagating optical energy from a waveguided mode established by the waveguide to a weakly-coupled leaky mode established by the photonic crystal, the desired portion determined at least in part by the specified lattice constant;
wherein the apparatus includes an optical detector optically coupled to the photonic crystal and configured to detect outcoupled optical energy extracted by the array of periodic features;
wherein the outcoupled optical energy includes multiple wavelengths optically coupled to a single pixel or an array of pixels on the optical detector;
wherein the apparatus comprises a processor configured to receive information indicative of an intensity or location of outcoupled optical energy extracted by the array of periodic features and detected by the optical detector.

22. A method comprising:
collecting optical energy using an optical waveguide configured to support propagating optical energy in a first direction;
extracting a desired portion of propagating optical energy from the waveguide using a photonic crystal comprising a dielectric material, the photonic crystal located on an exterior surface of the optical waveguide;
wherein the photonic crystal comprises a first surface including a first array of periodic features on or within the dielectric material, the array extending in at least two dimensions and including an effective dielectric permittivity different from surrounding dielectric material;
wherein the periodic features include a specified lattice constant to determine at least in part a desired wavelength of the extracted desired portion via outcoupling the desired portion of propagating optical energy from a waveguided mode established by the waveguide to a weakly-coupled leaky mode established by the photonic crystal, the outcoupling occurring in a direction having a component orthogonal to the waveguided propagation in the first direction; and
wherein the method includes detecting outcoupled optical energy extracted by the array of periodic features including using information about a location on an optical detector at which the outcoupled optical energy is detected.

* * * * *